(12) United States Patent
Murata

(10) Patent No.: US 9,082,051 B2
(45) Date of Patent: Jul. 14, 2015

(54) INFORMATION PROCESSING SYSTEM AND APPARATUS GENERATING IMAGE PATTERN IN WHICH ARE EMBEDDED AUTHENTICATED USER INFORMATION AND APPLICATION INFORMATION, CONTROLLING METHOD THEREFOR AND MEDIUM STORING A PROGRAM INSTRUCTING A COMPUTER TO EXECUTE THE METHOD

(71) Applicant: CANON KABUSHIKI KAISHA, Tokyo (JP)

(72) Inventor: Tomomi Murata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/904,508

(22) Filed: May 29, 2013

(65) Prior Publication Data
US 2013/0329252 A1 Dec. 12, 2013

(30) Foreign Application Priority Data

Jun. 12, 2012 (JP) .................................. 2012-132721

(51) Int. Cl.
G06F 3/12 (2006.01)
G06K 15/00 (2006.01)
H04N 1/00 (2006.01)
G06F 21/35 (2013.01)
G06F 21/60 (2013.01)
H04N 1/44 (2006.01)

(52) U.S. Cl.
CPC ............ *G06K 15/007* (2013.01); *G06F 3/1222* (2013.01); *G06F 3/1236* (2013.01); *G06F 3/1238* (2013.01); *G06F 3/1292* (2013.01); *G06F 21/35* (2013.01); *G06F 21/608* (2013.01); *G06K 15/002* (2013.01); *H04N 1/00* (2013.01); *H04N 1/00334* (2013.01); *H04N 1/00514* (2013.01); *H04N 1/4426* (2013.01); *H04N 1/4433* (2013.01); *H04N 2201/0075* (2013.01)

(58) Field of Classification Search
USPC .................................................. 358/1.1–1.16
See application file for complete search history.

(56) References Cited

U.S. PATENT DOCUMENTS

2007/0133843 A1* 6/2007 Nakatani ...................... 382/115
2013/0032634 A1* 2/2013 McKirdy ...................... 235/375

FOREIGN PATENT DOCUMENTS

JP 2007-079639 A 3/2007

OTHER PUBLICATIONS

McKirdy, Sean, U.S. Appl. No. 61/622,175 Specification, filed Jun. 12, 2012.*

*Primary Examiner* — Benny Q Tieu
*Assistant Examiner* — Michael Y Tzeng
(74) *Attorney, Agent, or Firm* — Fitzpatrick, Cella, Harper & Scinto

(57) ABSTRACT

A control unit 112 of an image forming apparatus generates a first image pattern in which a user information authenticated by an authentication processing unit 113 and an application information concerned with a predetermined application that can be used in the image forming apparatus by the user authenticated are embedded, and displays the first image pattern on a display unit 105. A control unit 208 of a mobile terminal analyzes the first image pattern read out by a camera unit 203 from the display unit 105 of the image forming apparatus to derive the user information and the application information. Furthermore, the control unit 208 of the mobile terminal displays, on a display unit 201 of the mobile terminal, an operation image frame for use a predetermined application corresponding to the derived application information during a period of reading out of the first image pattern by the camera unit 203.

7 Claims, 17 Drawing Sheets

DATA CONTAINED IN CERTIFICATION MARKER    1400

| ITEM | EXAMPLE OF DATA |
|---|---|
| MARKER NAME | AUTHENTICATION MARKER |
| IMAGE FORMING APPARATUS IP ADDRESS | 192.168.xxx.xxx |
| LOG-IN APPLICATION NAME | Default Authentication |
| LOG-IN APPLICATION VERSION | 10.2.3 |

FIG. 15

DATA CONTAINED IN APPLICATION
DISPLAYING MARKER PER LOG-IN USER     1500

| ITEM | EXAMPLE OF DATA |
|---|---|
| MARKER NAME | APPLICATION DISPLAYING MARKER |
| DEVICE LOG-IN AUTHENTICATION RESULT | OK |
| LOG-IN USER NAME (ID) | Administrator |
| DISPLAYING APPLICATION NAME | TALLYING APPLICATION |
| DISPLAYING APPLICATION VERSION | 3.4.0 |
| DISPLAYING APPLICATION USER INFORMATION | COLOR, 12345<br>MONOCHROME, 67890<br>NUMBER OF OUTPUTS, 80235<br>COLOR RATIO, 15<br>DOUBLE SIDE RATIO, 100<br>TALLYING RATIO, 100 |

FIG. 16

USER INFORMATION TRANSMITTED
FROM MOBILE TERMINAL     1600

| ITEM | EXAMPLE OF DATA |
|---|---|
| BRIEF INFORMATION | DISPLAYING USER INFORMATION FOR AUTHENTICATION |
| LOG-IN USER NAME (ID) | Administrator |
| PASSWORD | password |

FIG. 23

DATA CONTAINED IN LIST DISPLAYING MARKER  2300

| ITEM | EXAMPLE OF DATA |
| --- | --- |
| MARKER NAME | LIST DISPLAYING MARKER |
| DEVICE LOG-IN AUTHENTICATION RESULT | OK |
| LOG-IN USER NAME (ID) | Administrator |
| APPLICATION LIST | TALLYING APPLICATION, SECURE PRINT, ○○○, × × ×, △△△ |

FIG. 24

APPLICATION INFORMATION TRANSMITTED FROM MOBILE TERMINAL  2400

| ITEM | EXAMPLE OF DATA |
| --- | --- |
| BRIEF INFORMATION | DISPLAYING APPLICATION INFORMATION |
| LOG-IN USER NAME (ID) | Administrator |
| DISPLAYING APPLICATION | SECURE PRINT |

INFORMATION PROCESSING SYSTEM AND APPARATUS GENERATING IMAGE PATTERN IN WHICH ARE EMBEDDED AUTHENTICATED USER INFORMATION AND APPLICATION INFORMATION, CONTROLLING METHOD THEREFOR AND MEDIUM STORING A PROGRAM INSTRUCTING A COMPUTER TO EXECUTE THE METHOD

BACKGROUND OF THE INVENTION

1. Field of the Invention

The present invention relates to a technology of displaying information concerning an application installed in an image forming apparatus, and particularly, relates to a technology of controlling a mobile terminal and the image forming apparatus.

2. Description of the Related Art

An image forming apparatus of recent years has improved its image processing function, and as a result, an apparatus provided with various functions has come to be developed. In addition, in the image forming apparatus, many apparatuses employ an LCD (liquid crystal display) panel as an operation display apparatus for operating the display/selection of an application function, or the like.

In addition, mobile terminals of these days such as a mobile telephone and a PDA (Personal Digital Assistant) have come to be multifunctional.

From this background, there are growing demands to transmit information that the mobile terminal holds to the image forming apparatus and print the information, or to receive information in the image forming apparatus with the mobile terminal and display or operate the information.

Patent Document 1 discloses the technology as follows: a user holds above a mobile terminal to a predetermined position of an image forming apparatus; then, the terminal and the apparatus exchange the addresses of wireless LAN (Local Area Network) mutually through short-range wireless communication (non-contact IC card and card reader) which has been provided in the apparatus and the terminal; the image forming apparatus authenticates the user on its image frame; after that, the mobile terminal transfers data held therein to the image forming apparatus through wireless LAN and prints the data; the image forming apparatus transfers the data held therein to the mobile terminal; and the mobile terminal saves the data therein.

In Japanese Patent Application Laid-Open No. 2007-79639, after a user selects a file to be printed on a mobile terminal, the mobile terminal displays an image frame thereon for setting printing conditions. The user can select the printing conditions from this image frame, and can print the data held in the mobile terminal and simultaneously can save the data held in the image forming apparatus.

As for operation of the image forming apparatus on an LCD, the purposes are different among each user, and accordingly, both the image frame displayed on the LCD and operation are also occasionally different depending on each user, in the case where usage records of printing are displayed or in the case of reservation printing or the like. For this reason, in order to identify the user, it is common for the user to perform operation after having logged in to the image forming apparatus, and when a certain user is using the image forming apparatus, other users should not use the image forming apparatus from the aspect of security as well.

However, in Japanese Patent Application Laid-Open No. 2007-79639, the image forming apparatus can communicate with the mobile terminal through wireless LAN communication, and accordingly, the user can use the image forming apparatus even remotely from the image forming apparatus. On the other hand, it is difficult for other users to know who uses the image forming apparatus. Because of this, when a certain user has left the image forming apparatus in a state of having logged in to the image forming apparatus, and having used the image forming apparatus through the mobile terminal, such event can probably occur that the image forming apparatus in the logged-in state by a user is used by another user, or a user is logged out from the mobile terminal without permission by another user. In addition, there is a problem that multi log-in can also occur.

In Japanese Patent Application Laid-Open No. 2007-79639, there is also a problem that it is necessary for a user to perform such a complicated operation as to input a pin number on the display unit of the image forming apparatus in order to identify the user, which is troublesome for the user.

SUMMARY OF THE INVENTION

An object of the present invention is to provide a mechanism which reduces such a possibility that an image forming apparatus is used simultaneously by a plurality of users, and can keep the security of a user, even when the user uses the image forming apparatus through a mobile terminal.

The present invention relates to an information processing system which has an image forming apparatus and a mobile terminal, wherein the image forming apparatus has an authentication unit configured to authenticate a user; a first generating unit configured to generate a first image pattern in which user information authenticated by the authentication unit and application information concerned with a predetermined application which can be used in the image forming apparatus by the user authenticated are embedded; and a display control unit configured to display, on a display unit of the image forming apparatus, the first image pattern generated, and wherein the mobile terminal has a read out unit configured to read out an image pattern displayed on the display unit of the image forming apparatus; a deriving unit configured to analyze the first image pattern read out by the read out unit, to derive the user information and the application information; and a control unit configured to control a display unit of the mobile terminal to display an operation image frame for use of a predetermined application corresponding to the application information derived by the deriving unit, on the display unit, during a period of reading out of the first image pattern by the read out unit.

Further features of the present invention will become apparent from the following description of exemplary embodiments with reference to the attached drawings.

BRIEF DESCRIPTION OF THE DRAWINGS

FIG. 15 is a view illustrating one example of a data format of information which is contained in an application displaying marker of a log-in user.

FIG. 16 is a view illustrating one example of the user information which is used for authenticating the log-in to a device.

FIG. 23 is a view illustrating one example of a data format which is contained in a list displaying marker of an application that the log-in user can use.

FIG. 24 is a view illustrating one example of a data format of application information which is transmitted to the image forming apparatus from the mobile terminal, in Exemplary Embodiment 2.

DESCRIPTION OF THE EMBODIMENTS

Preferred embodiments of the present invention will now be described in detail in accordance with the accompanying drawings.

Exemplary Embodiment 1

One exemplary embodiment of an image forming apparatus according to the present invention will be described below. In the present exemplary embodiment, an SFP printer, in other words, a Single Function Peripheral printer, will be described below as one example of the image forming apparatus. Incidentally, the image forming apparatus includes a multifunctional machine (MFP: Multi Function Peripheral) in which functions of apparatuses such as a copying machine, a facsimile and a scanner are incorporated in one housing, and the present invention can also be applied to such image forming apparatus, other than such an SFP.

Figure 1:
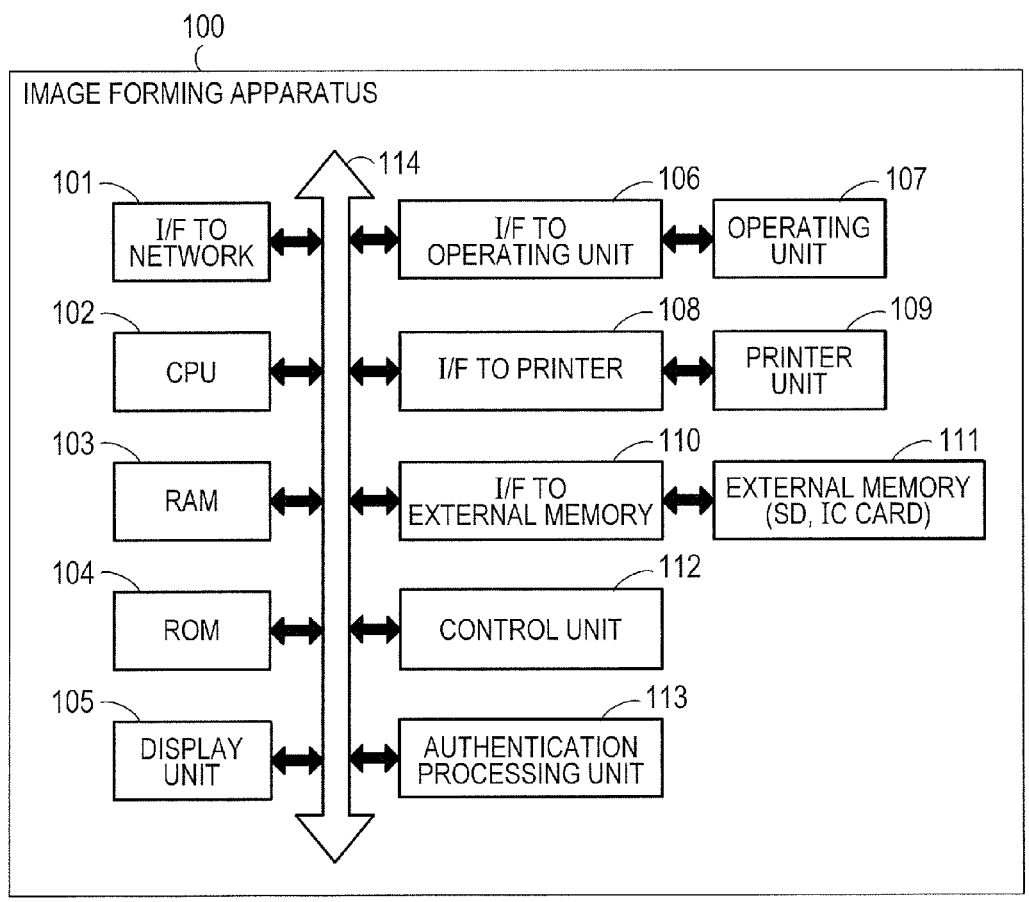
FIG. 1 is a block diagram illustrating one example of a hardware configuration which illustrates one exemplary embodiment of an image forming apparatus that can be applied to the present invention.

FIG. 1 is a block diagram illustrating one example of a hardware configuration which illustrates one exemplary embodiment of an image forming apparatus that can be applied to the present invention.

FIG. 1 shows an image forming apparatus 100 of the present exemplary embodiment.

In the image forming apparatus 100, an interface 101 to a network (I/F to network) is connected to an intranet or the Internet through a wireless or wired network, and receives user information or a control command.

This I/F 101 to a network is configured to enable wireless communication with a mobile terminal, which will be described later. This communication may be performed directly through wireless communication, or may be performed through an access point installed on a wired network. In addition, the communication method includes Wi-Fi (Wireless Fidelity) and Bluetooth.

A CPU 102 outputs an image signal of output information to a printer unit 109 through an I/F 108 to a printer which is connected to a system bus 114, based on a control program and the like. Incidentally, the control program is computer-readably memorized in a ROM 104, an external memory 111 or the like.

In addition, the CPU 102 enables communication processing with the mobile terminal 200 through the I/F 101 to a network. Furthermore, the CPU 102 executes processing based on an application program and the like which have been memorized in the ROM 104 or the external memory 111.

A RAM 103 functions as a main memory, a work area and the like of the CPU 102, and is configured to be capable of expanding the memory capacity by an optional RAM which is connected to a not-shown add-on port. In addition, the RAM 103 is used in an output information expanding region, an environmental information storage region, an NVRAM and the like.

The ROM 104 is shown. The external memory 111 is an SD memory card or the like. The control program for the CPU 102, the font information which is used when the above-described output information is produced, information which is used on the image forming apparatus 100 and the like are memorized in the ROM 104 or the external memory 111.

A display unit 105 is configured by a liquid crystal display device, and displays various information such as a drive condition, a device state and an input state. An interface 106 to an operating unit (I/F to an operating unit) takes charge of an interface between an operating unit 107 and other units, and also receives information which has been input by a user through the operating unit 107.

The operating unit 107 is configured by keys through which the user performs an input operation such as setting, a command and the like. The interface 108 to a printer (I/F to a printer) outputs an image signal of output information to a printer unit 109 (printer engine).

An I/F 110 to an external memory (memory controller) controls access to the external memory 111 such as an SD memory card and an IC card. For information, the number of the above-described external memory may not be limited to one but may be at least one or more, and the image forming apparatus may be configured so that a plurality of external memories can be connected thereto in which an optional font card in addition to a self-contained font and a program for interpreting a printer control language having a different language system are stored.

A control unit 112 manages the setting and the command sent from the user, and processes the information which has been received from the mobile terminal. An authentication processing unit 113 authenticates a user and a work group, and further authenticates print jobs. The control unit 112 and the authentication processing unit 113 have a not-shown CPU and a not-shown storage device such as a flash memory stored therein, and the CPU executes the program stored in the storage device to thereby executes the above-described control processing and authentication processing.

The system bus 114 connects each of the above-described devices with other devices.

In the example of FIG. 1, a configuration is illustrated in which the control unit 112 and the authentication processing unit 113 are provided as hardware. However, the image forming apparatus may be configured so that the control unit 112 and the authentication processing unit 113 are not provided therein as hardware but the CPU 102 executes the above-described control processing and authentication processing by executing the program stored in the ROM 104 or the external memory 111.

Figure 2:
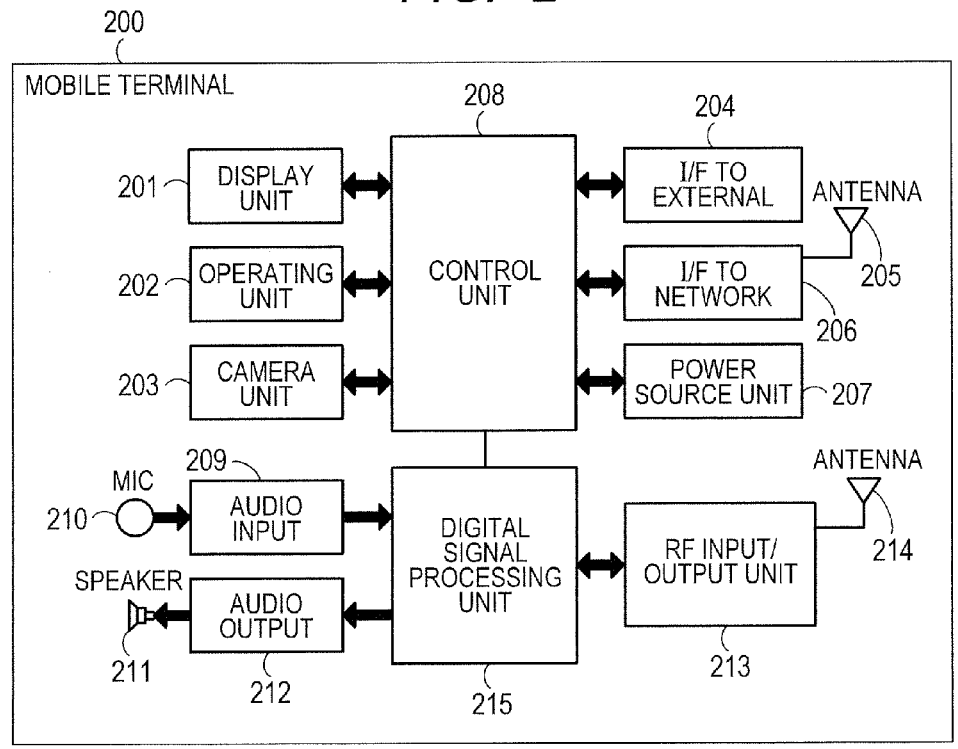
FIG. 2 is a block diagram illustrating one example of a hardware configuration which illustrates one exemplary embodiment of a mobile terminal that can be applied to the present invention.

FIG. 2 is a block diagram illustrating one example of a hardware configuration which illustrates one exemplary embodiment of a mobile terminal that can be applied to the present invention. Incidentally, the following configuration in the present exemplary embodiment will be described below, but the present invention can be applied to devices which can perform the communication concerning information, and does not particularly limit the device to that effect in the drawing.

FIG. 2 shows the mobile terminal 200 of the present exemplary embodiment.

In the mobile terminal 200, a display unit 201 displays and outputs information to a user, and is configured by an LCD driver, an LCD display device and the like. An operating unit 202 is a portion through which a user inputs operation information to the mobile terminal 200. Incidentally, the operating unit 202 may include a touch panel provided on the display unit 201.

A camera unit 203 is shown, and the photographed image data is stored in the flash memory (not shown) which a control unit 208 has. An I/F 204 to external provides an interface between the I/F to external and an external device, and is configured by a communication interface circuit, a Micro USB terminal and the like.

An I/F 206 to a network is provided with an antenna 205 for communicating with other devices through a wireless LAN. The I/F 206 to a network is configured to enable wireless communication with the image forming apparatus 100 through a router, which will be described later.

A power source unit 207 generates electric power based on a battery power source and supplies necessary electric power to each block. The control unit 208 is a main part for achieving the functions of the mobile terminal, and is configured by a not-shown CPU, a storage device (EEPROM, flash memory SRAM and the like) and the like.

An audio input unit 209 converts an analog audio signal sent from a microphone 210 into a digital signal. An audio output unit 212 is a portion at which the audio output unit drives a speaker by the received digital audio signal.

An RF input/output unit 213 transmits and receives information by high frequency wave. A digital signal processing unit 215 is connected with each of the audio input unit 209 which is connected with the microphone 210, the audio output unit 212 which is connected with a speaker 211, and the RF input/output unit 213 which is connected with an antenna 214. Then, the digital signal processing unit 215 performs the encoding of the digital audio signal, the decoding to the digital audio signal, and the like.

Figure 3:
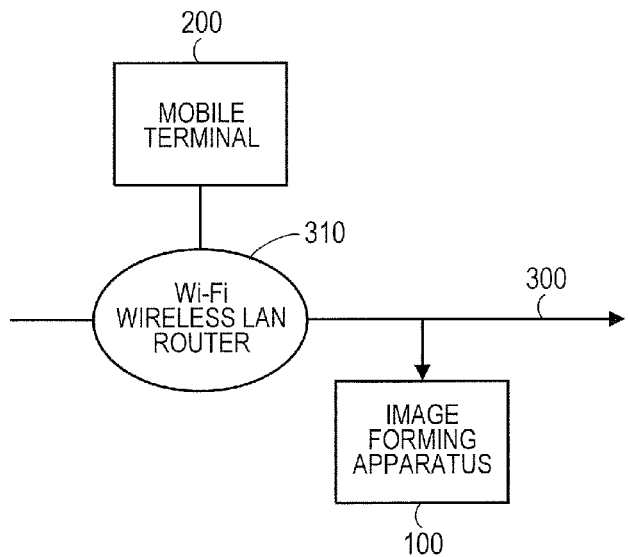
FIG. 3 is a system block diagram for describing the configuration of an information processing system which includes an image forming apparatus 100 and a mobile terminal 200, in the present exemplary embodiment.

FIG. 3 is a system block diagram for describing the configuration of an information processing system (image forming system) which includes the image forming apparatus 100 and the mobile terminal 200, in the present exemplary embodiment.

As is illustrated in FIG. 3, communication is performed from the mobile terminal 200 to the image forming apparatus 100 through wireless LAN, and the mobile terminal 200 is connected to a network 300 through a router 310.

Incidentally, hereinafter, the processes of the image forming apparatus 100 and the mobile terminal 200 will be described, which are performed when a user logs in to the image forming apparatus 100 from the mobile terminal 200, and has the mobile terminal 200 display information thereon that is provided by a tallying application which is provided in the image forming apparatus 100. For information, the tallying application is application which determines a record of printing and a tendency of use by the user during a predetermined tallying period, and provides a function of displaying the result on a display image frame or notifying the user of the result, and the like.

In the image forming apparatus 100 of the present exemplary embodiment, the CPU 102 starts up various applications including the above-described tallying application when a power source is turned on and the apparatus is started up.

Figure 4:
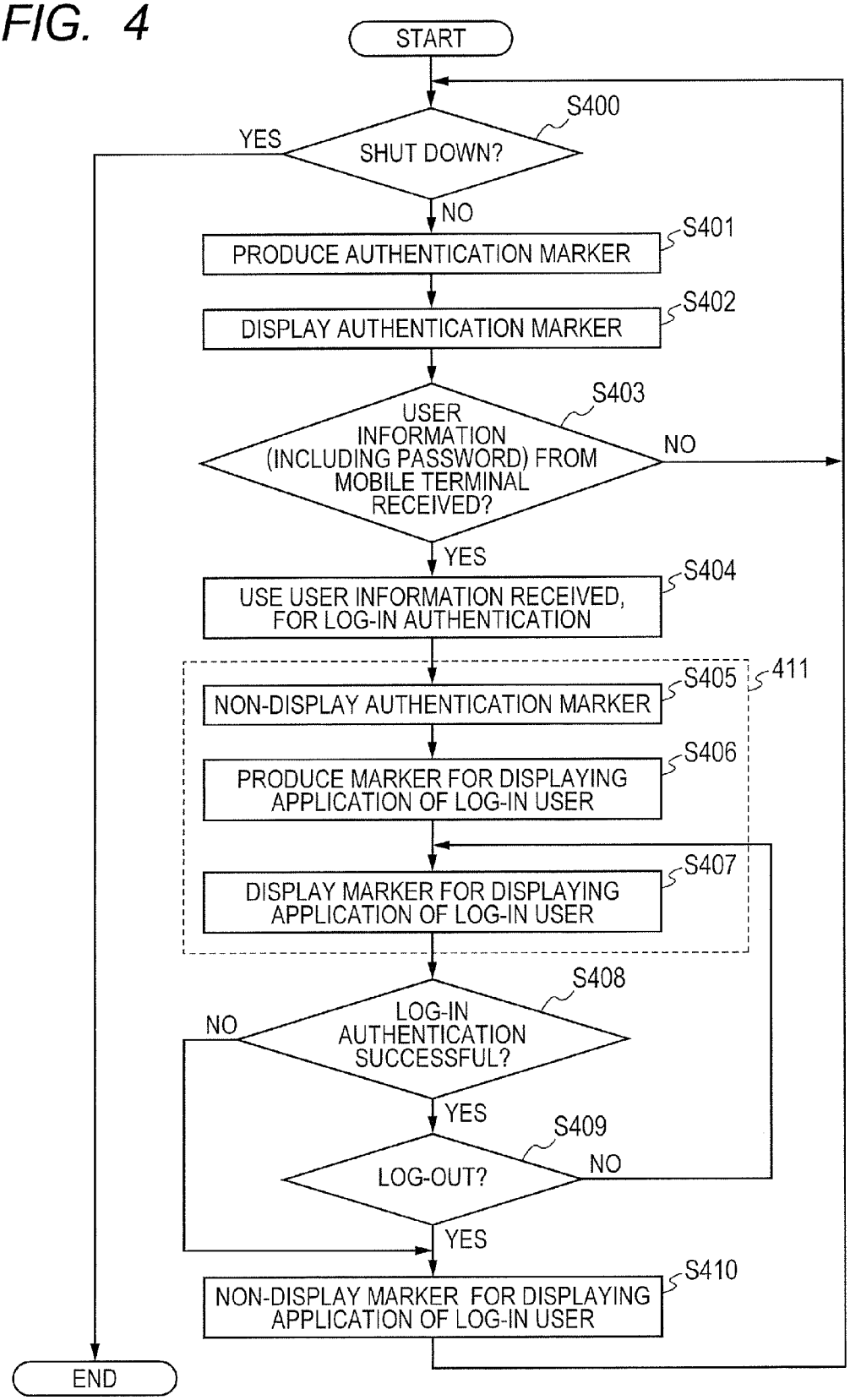
FIG. 4 is a flow chart illustrating one example of processing which is executed by a control unit 112 of the image forming apparatus 100, in Exemplary Embodiment 1.

FIG. 4 is a flow chart illustrating one example of processing which is executed by the control unit 112 of the image forming apparatus 100, in Exemplary Embodiment 1. Incidentally, the processing in this flow chart is achieved by such operation that the CPU (not shown) in the control unit 112 reads out a program which has been computer-readably recorded in the storage device (not-shown) in the control unit 112, and executes the read out program.

In S400, the user performs a log-out operation in the operating unit 107 or the like, and the control unit 112 determines whether the log-out operation has been notified thereto through the I/F 106 to the operating unit or the like, or not.

If the control unit 112 determines that a shut-down command has been notified thereto (in the case of Yes, in S400), the control unit 112 ends the processing in this flow chart. The CPU 102 executes the shut-down processing.

On the other hand, if the control unit 112 determines that the shut-down command has not been notified thereto (in the case of No, in S400), the control unit 112 advances the processing to S401.

In S401, the control unit 112 produces an authentication marker which is used for log-in to a device. In S402, the control unit 112 has the display unit 105 display an authentication marker 801 (FIG. 8) thereon (display control).

Figure 8:
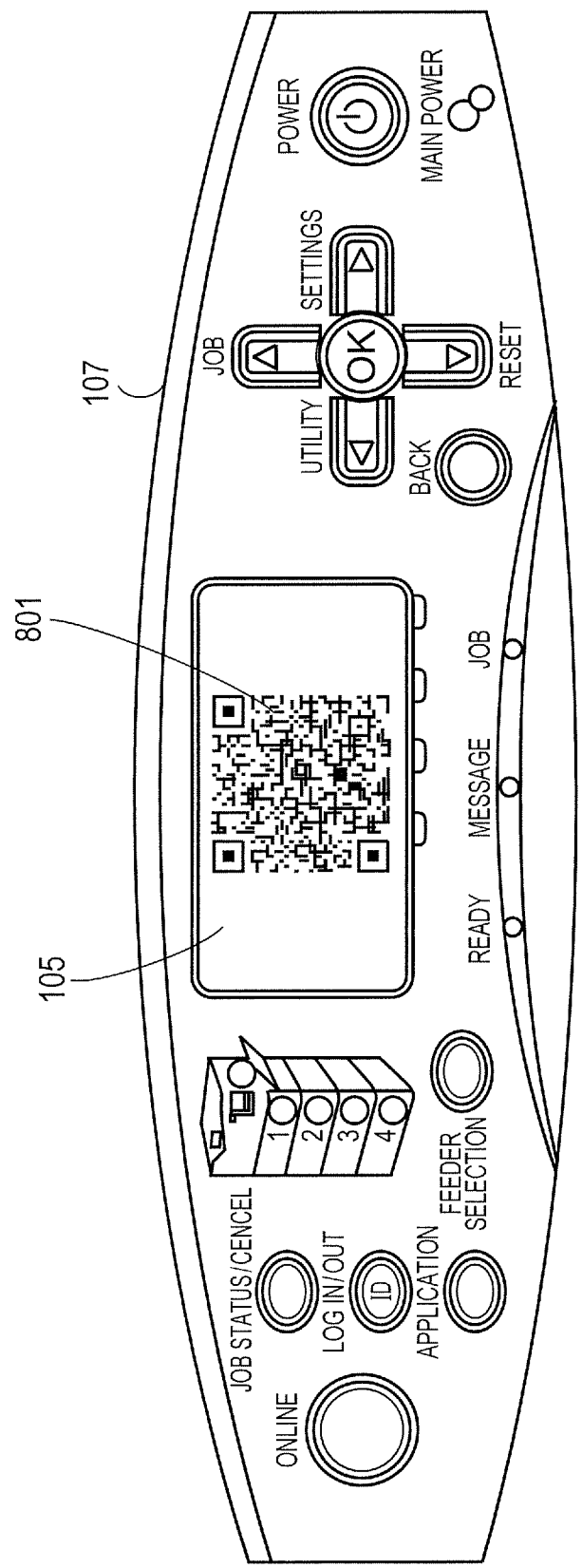
FIG. 8 is a view illustrating one example of an image frame which is displayed on a display unit 105 of the image forming apparatus 100.

FIG. 8 is a view illustrating one example of an image frame which is displayed on a display unit 105 of the image forming apparatus 100. The authentication marker 801 contains: a marker name; LAN address information by which the image forming apparatus performs wireless LAN communication with the mobile terminal 200 (an IP address of the image forming apparatus when the image forming apparatus uses a TCP/UDP/IP protocol), and information for the user to log in to a device (log-in application name, log-in application version and the like), as illustrated in 1400 of FIG. 14.

Figures 13, 14:
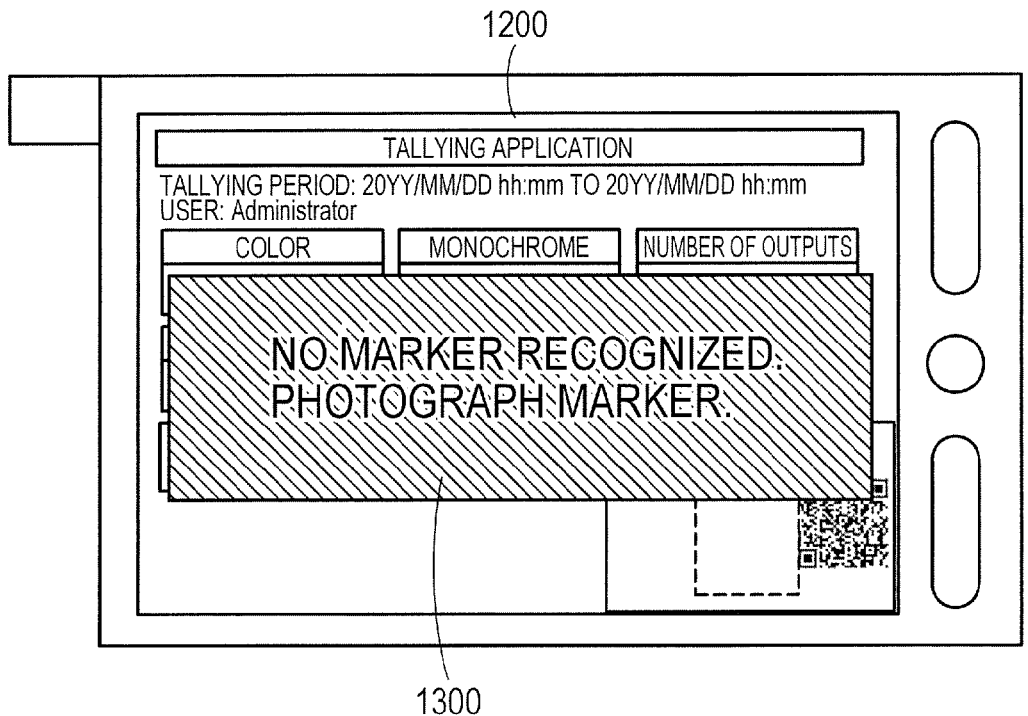
FIG. 13 is a view illustrating one example of a display image frame which is displayed on the display unit 201 in S512 in FIG. 5.
FIG. 14 is a view illustrating one example of a data format of information which is contained in the authentication marker.

FIG. 14 is a view illustrating one example of a data format of the information which is contained in the authentication marker. For information, the data format for the information contained in the authentication marker is not limited, and any data format may be used. For instance, XML, JSON, CSV and the like may be used.

Hereafter, the description will be returned to that for the flow chart of FIG. 4.

Next, in S403, the control unit 112 determines whether the I/F 101 to a network has received the user information (containing password) which is sent from the mobile terminal 200 through the network 300 or not. Specifically, the control unit 112 determines whether the I/F 101 to a network has received the user information which has been transmitted from the mobile terminal 200, by using the address information embedded in the authentication marker that has been displayed in the above-described S402 or not.

If the control unit 112 determines that the I/F 101 to a network does not receive the user information from the mobile terminal 200 (in the case of No, in S403), the control unit 112 returns the processing to S400.

On the other hand, if the control unit 112 determines that the I/F 101 to a network has received the user information from the mobile terminal 200 (in the case of Yes, in S403), the control unit 112 advances the processing to S404.

In S404, the control unit 112 directs the authentication processing unit 113 to perform authentication processing based on the above-described user information which has been received. In addition, the authentication processing unit 113 determines whether the above-described user information that has been received from the mobile terminal 200 coincides with the user information which has been previously stored in the RAM 103 or the external memory 111 of the image forming apparatus 100 or not, and returns the determination result to the control unit 112. Incidentally, the authentication processing unit 113 may use user information which is managed in a not-shown known external authentication server as the user information.

In S405, the control unit 112 has the display unit 105 hide the authentication marker which is displayed on the display unit 105.

Next, in S406, the control unit 112 produces a marker for displaying application (hereinafter referred to as application displaying marker) of a log-in user. Incidentally, the log-in user refers to a user who corresponds to the user information which has been received from the mobile terminal 200 in the above-described S403, in other words, a user which has tried log-in authentication in the above-described S404. The produced application displaying marker of the log-in user contains a marker name, a result of the authentication of the log-in to a device, and information on the log-in user and information on a displaying application, as illustrated in 1500 of FIG. 15. Incidentally, the result of the authentication of the log-in to a device is produced based on the result of the authentication processing which has been directed to the authentication processing unit 113 in the above-described S404. In addition, the information on the displaying application contains a name and version of the application (for instance, tallying application) which the log-in user can use in the image forming apparatus 100.

The information on the displaying application also contains management information on the displaying application corresponding to the log-in user. Specifically, in the case of the tallying application, the information contains a usage status of the image forming apparatus and information on a saving ratio such as a color ratio and a double-side ratio, by the log-in user, as management information. Here, in FIG. 15, the usage status of the image forming apparatus and the information on the saving ratio by the log-in user are embedded in the marker as the management information (user information on displaying application). However, access information such as a URL and a path for accessing to a server (not shown) which manages the usage status and the information on the saving ratio of the image forming apparatus by the log-in user may be embedded in the marker, as the management information.

FIG. 15 is a view illustrating one example of a data format of the information which is contained in the application displaying marker of the log-in user. In addition, also in FIG. 15, the data format is not limited similarly to FIG. 14.

Hereafter, the description will be returned to that for the flow chart of FIG. 4.

Next, in S407, the control unit 112 has the display unit 105 display (display control) the application displaying marker of the log-in user, which has been produced in the above described S406.

Next, in S408, the control unit 112 determines a result of the authentication processing which the control unit 112 has directed to the authentication processing unit 113 in the above-described S404.

If the control unit 112 determines that the result is failure in authentication (in the case of No, in S408), the control unit 112 advances the processing to S410.

On the other hand, if the control unit 112 determines that the result is success in authentication (in the case of Yes, in S408), the control unit 112 advances the processing to S409. Incidentally, in the case of success in authentication, the log-in processing of the log-in user is executed by the CPU 102.

In S409, the user performs a log-out operation in the operating unit 107 or the like, and the control unit 112 determines whether the log-out notification has been notified thereto through the I/F 106 to the operating unit or the like or not. Incidentally, during the processing in a dotted line frame of 411, the control unit 112 is in a state of being ready to receive the log-out notification at anytime, and when having received the log-out notification, the control unit 112 immediately advances the processing to log-out determination processing of S409. In addition, the log-out notification includes notifications due to time out and due to a command from the mobile terminal 200.

If the control unit 112 determines that the control unit 112 has received the log-out notification (in the case of Yes, in S409), the control unit 112 advances the processing to S410. In this case, the log-out processing is executed by the CPU 102.

In S410, the control unit 112 has the display unit 105 hide the application displaying marker of the log-in user, which is displayed on the display unit 105, and returns the processing to S400.

On the other hand, if the control unit 112 determines that the control unit 112 has not received the log-out notification (in the case of No, in S409), the control unit 112 returns the processing to S407, and controls the display unit 105 so as to continue displaying the application displaying marker of the log-in user.

As has been shown above, the control unit 112 of the image forming apparatus 100 generates an application displaying marker (first image pattern) in which the information on the log-in user and the application information are embedded, displays the generated marker on the display unit 105 (first generation processing), to thereby present the application information on the log-in user to the mobile terminal 200.

Incidentally, before the authentication, the control unit 112 of the image forming apparatus 100 generates an authentication marker (second image pattern) in which address information for communicating with the image forming apparatus 100 therethrough is embedded, has the display unit of the above-described image forming apparatus display the generated marker on the display unit (second generation processing), performs authentication processing with the use of the address information embedded in the authentication marker, based on the user information (authentication information) which has been transmitted from the mobile terminal 200, to thereby facilitate the transmission of the authentication information from the mobile terminal 200.

Next, processing which is executed by the mobile terminal 200 in Exemplary Embodiment 1 will be described below with reference to FIG. 5.

Figure 5:
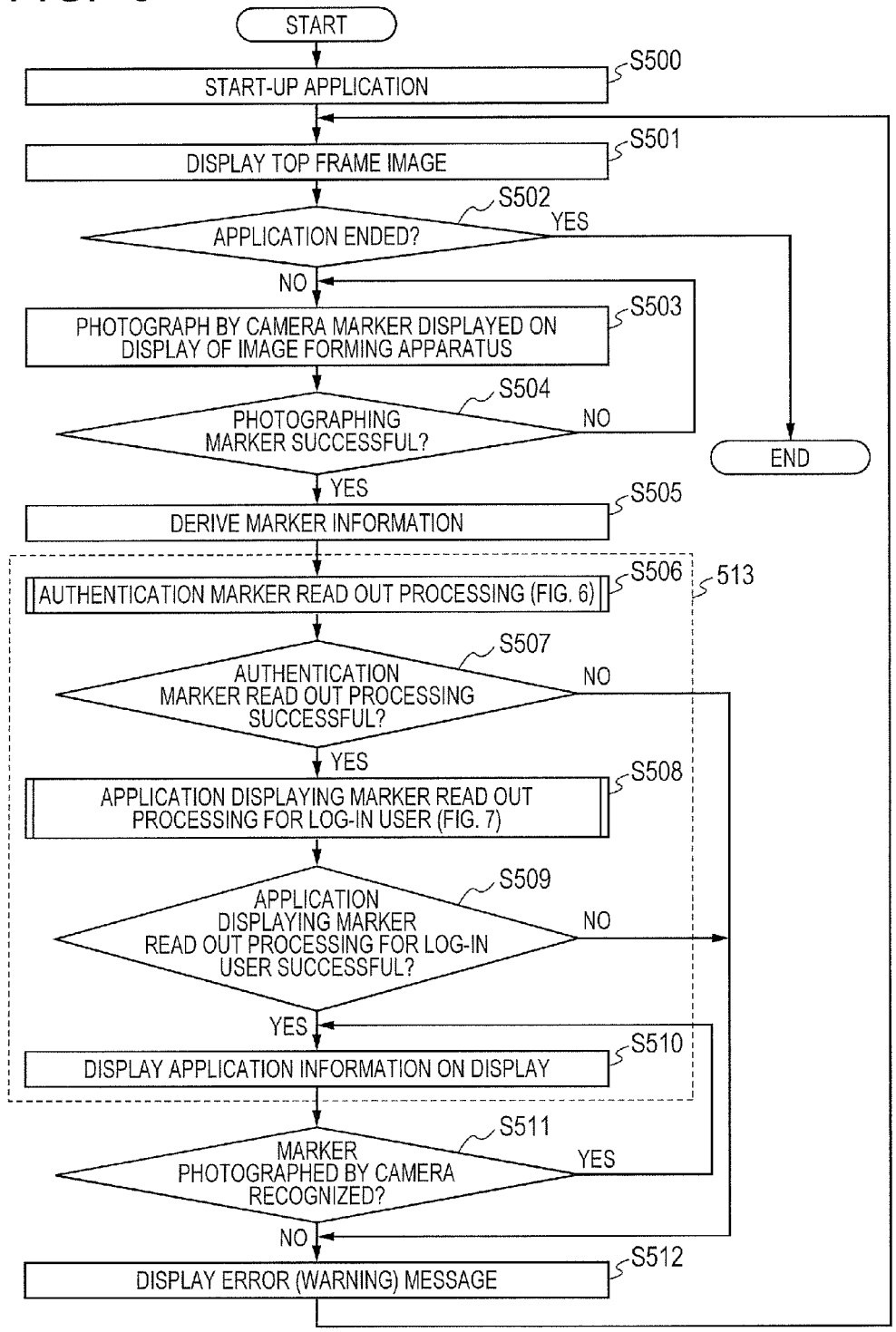
FIG. 5 is a flow chart illustrating one example of processing which is executed by the mobile terminal 200, in Exemplary Embodiment 1.
Figure 6:
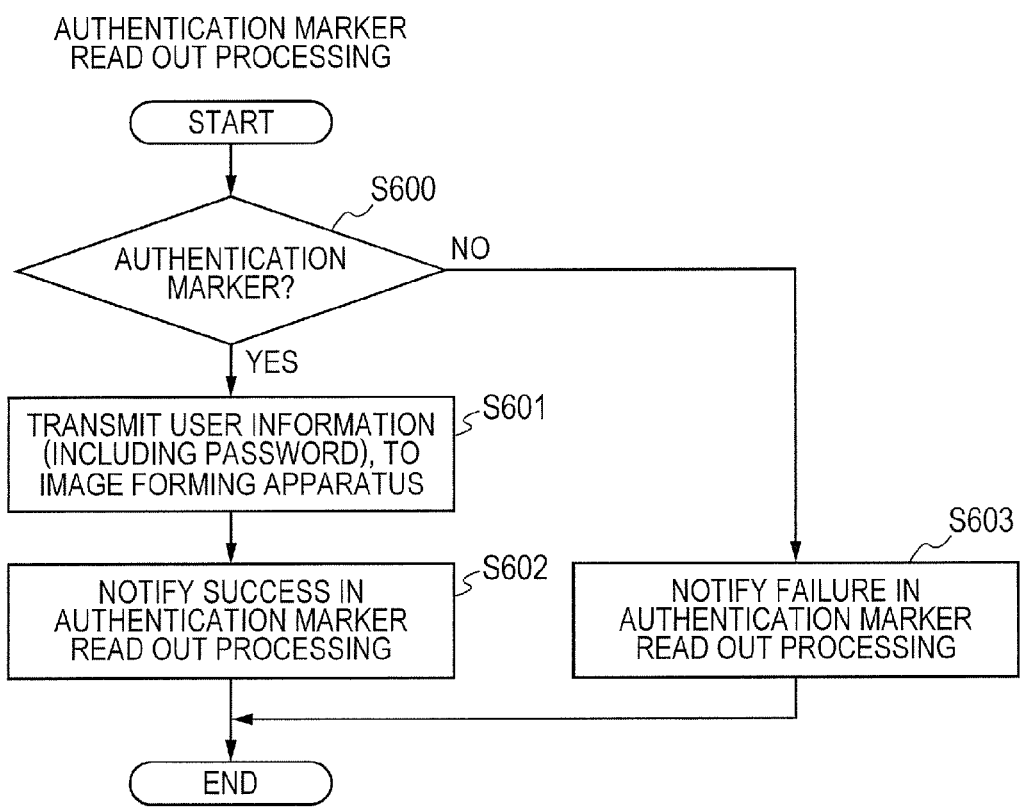
FIG. 6 is a flow chart illustrating details of processing of S506 in FIG. 5.
Figure 7:
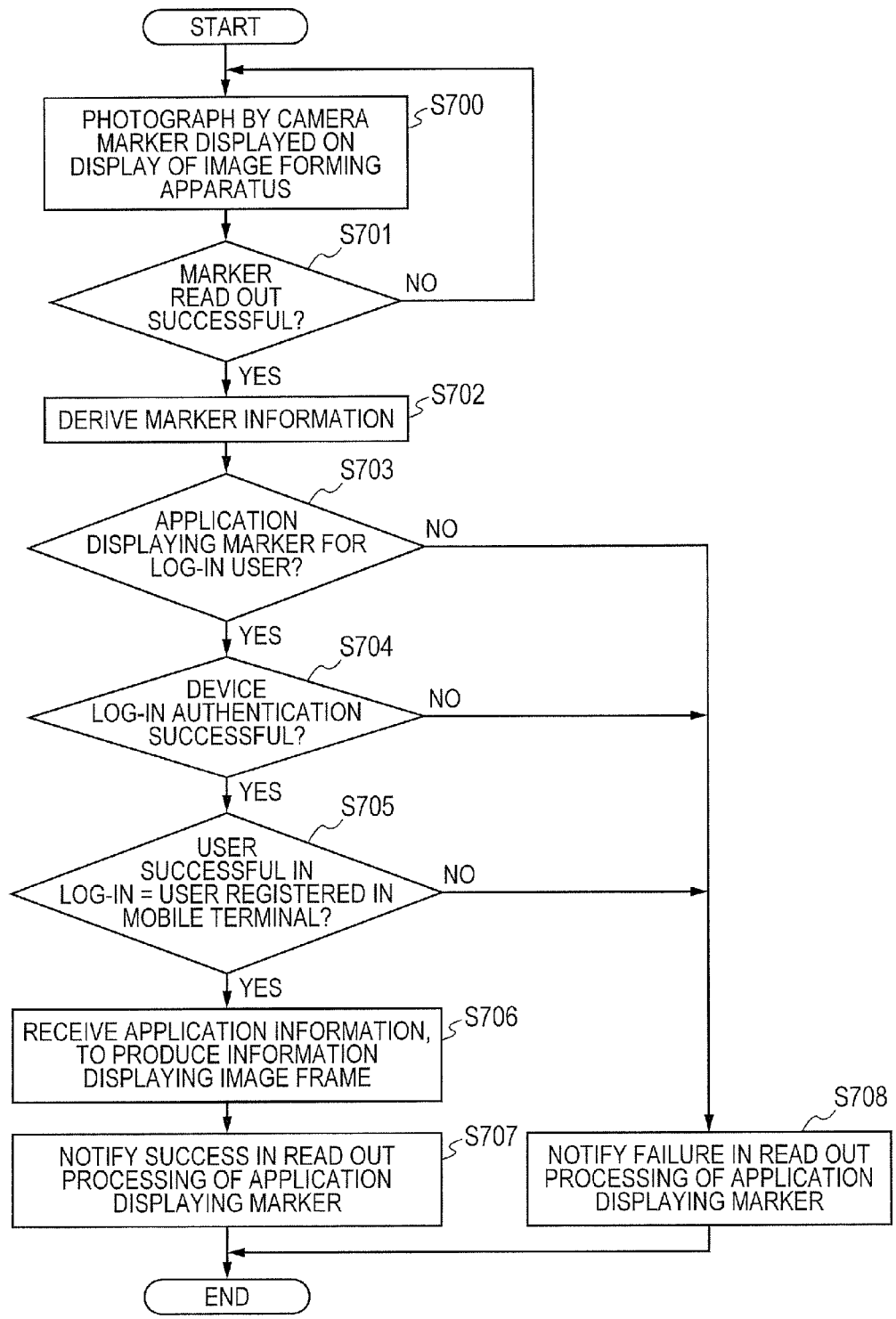
FIG. 7 is a flow chart illustrating details of processing of S508 in FIG. 5.

FIG. 5 is a flow chart illustrating one example of the processing which is executed by the mobile terminal 200 in Exemplary Embodiment 1. Incidentally, the processing in the flow charts illustrated in FIG. 5 to FIG. 7 is achieved by such operation that a CPU (not shown) in the control unit 208 of the mobile terminal 200 executes a program which has been computer-readably recorded in an internal storage device (not shown).

Firstly, when the control unit 208 has received a start-up operation (touch operation to 903 in FIG. 9) of a marker read out application by the user through a menu image frame (FIG. 9) which is displayed on the display unit 201, the control unit 208 starts up the marker read out application (S500).

After the start-up of the marker read out application, the control unit 208 has the display unit 201 display a top frame image 1000 (FIG. 10) of the marker read out application on the display unit 201 in S501.

Figure 9:
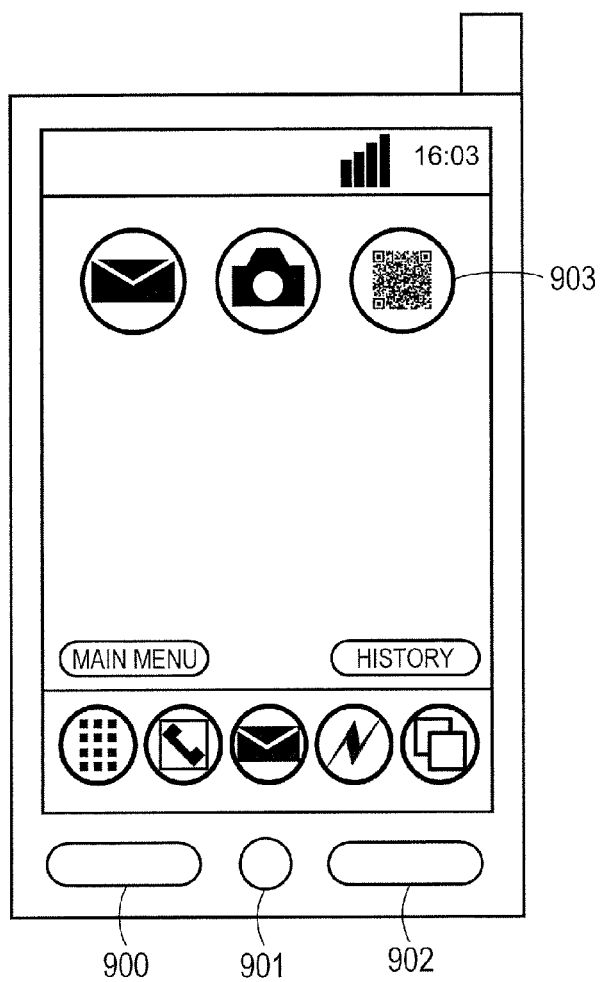
FIG. 9 is a view illustrating one example of a menu image frame which is displayed on a display unit 201.

FIG. 9 is a view illustrating one example of a menu image frame which is displayed on the display unit 201.

In FIG. 9, buttons 900, 901 and 902 are buttons of hardware, and can be operated by the user. An icon 903 is an icon for starting up the marker read out application.

Figure 10:
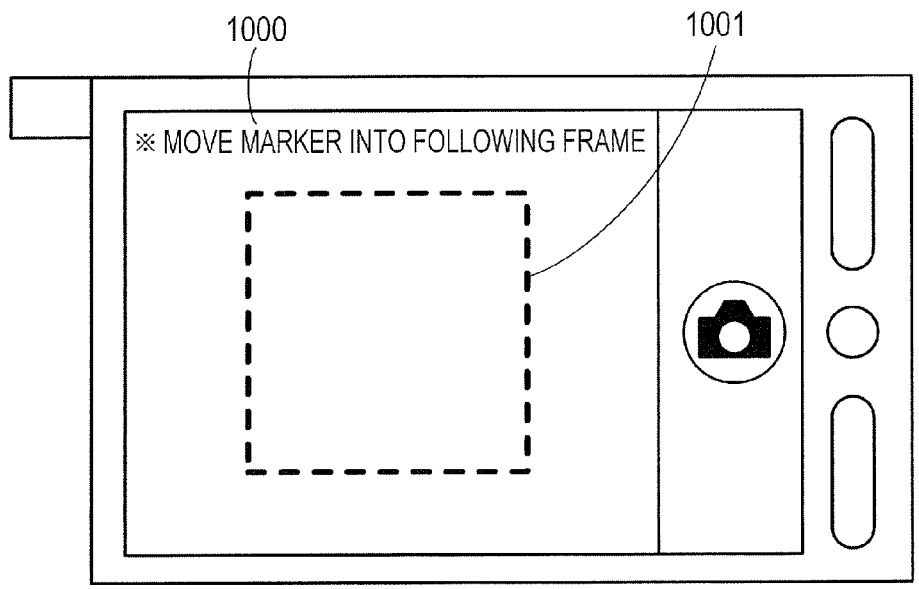
FIG. 10 is a view illustrating one example of a top frame image 1000 of a marker read out application.

FIG. 10 is a view illustrating one example of the top frame image 1000 of the marker read out application.

In FIG. 10, a dotted line frame 1001 is a frame for checking the read out for the marker. The user adjusts an image pickup position in the mobile terminal 200 so that the marker is displayed within this dotted line frame 1001.

Incidentally, the image frames in FIG. 9 and FIG. 10 each are just one example, and may be image frames different from those in the present exemplary embodiment.

Hereafter, the description will be returned to that for the flow chart of FIG. 5.

In S502, the control unit 208 determines whether the end of the marker read out application has been directed or not.

If the control unit 208 determines that the end of the marker read out application has been directed (in the case of Yes, in S502), the control unit 208 ends the marker read out application (not-shown), and ends the processing in the present flow chart.

On the other hand, if the control unit 208 determines that the end of the marker read out application has not been directed (in the case of No, in S502), the control unit 208 advances the processing to S503.

Figure 11:
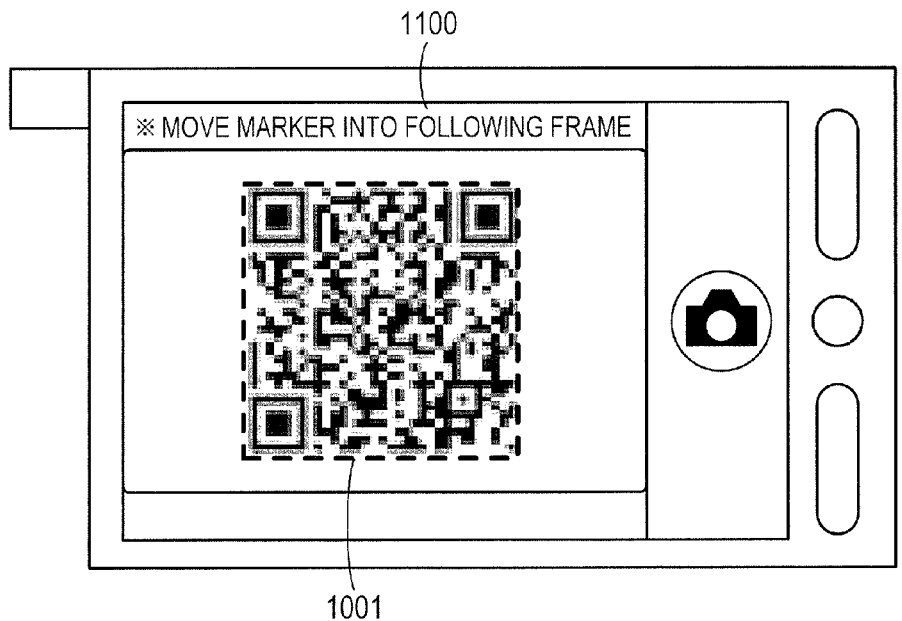
FIG. 11 is a view illustrating one example of an image frame of the display unit 201 of the mobile terminal 200 when an authentication marker is read out.

In S503, the control unit 208 has a camera unit 203 take an image of the authentication marker which is displayed on the display unit 105 of the image forming apparatus 100 and read out the authentication marker, and simultaneously has the display unit 201 display the read out image on the display unit, as illustrated in 1100 of FIG. 11.

FIG. 11 is a view for illustrating one example of an image frame of the display unit 201 of the mobile terminal 200 when an authentication marker is read out.

In S504, the control unit 208 determines whether the camera unit has succeeded in reading out the marker or not.

If the control unit 208 cannot recognize the marker within the dotted line frame 1001, the control unit 208 determines that the camera unit has failed in reading out the authentication marker (in the case of No, in S504), returns the processing to S503, and controls the camera unit so as to read out the authentication marker again.

On the other hand, if the control unit 208 can recognize the marker within the dotted line frame 1001, the control unit 208 determines that the camera unit has succeeded in reading out the authentication marker (in the case of Yes, in S504), and advances the processing to S505.

In S505, the control unit 208 analyzes the information which has been input through the camera unit 203 and is contained in the authentication marker, and derives the analyzed information.

Next, in S506, the control unit 208 executes the read out processing for the authentication marker, based on the information (information contained in authentication marker) which has been derived in the above-described S505. The details of the processing of S506 are illustrated in FIG. 6, which will be described later.

Next, in S507, the control unit 208 determines whether the processing of the above-described S506 has succeeded or not.

If the control unit 208 determines that the processing of the above-described S506 has failed (in the case of No, in S507), the control unit 208 advances the processing to S512, has the display unit 201 display an error or warning message (1300 of FIG. 13) on the display unit, and returns the processing to S501.

FIG. 13 is a view illustrating one example of a display image frame which is displayed on the display unit 201 in S512 in FIG. 5.

On the other hand, if the control unit 208 determines that the processing of the above-described S506 has succeeded (in the case of Yes, in S507), the control unit 208 advances the processing to S508.

In S508, the control unit 208 executes marker read out processing for application display for the log-in user. Incidentally, the details of the processing of S508 are illustrated in FIG. 7, which will be described later.

Next, in S509, the control unit 208 determines whether the processing of the above-described S508 has succeeded or not.

If the control unit 208 determines that the processing of the above-described S508 has failed, (in the case of No, in S509), the control unit 208 advances the processing to S512, has the display unit 201 display an error or warning message (1300 of FIG. 13) on the display unit, and returns the processing to S501.

On the other hand, if the control unit 208 determines that the processing of the above-described S508 has succeeded (in the case of Yes, in S509), the control unit 208 advances the processing to S510.

Figure 12:
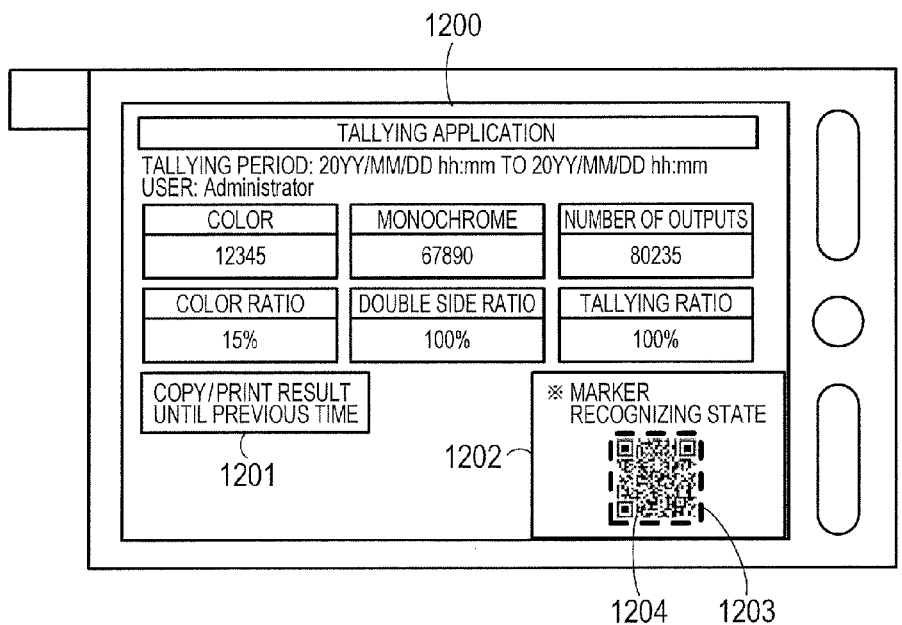
FIG. 12 is a view illustrating one example of an application image frame 1200 which is displayed on the display unit 201 in S510 in FIG. 5.

In S510, the control unit 208 has the display unit 201 display the application image frame such as 1200 of FIG. 12 on the display unit, together with a camera image frame (image taken by the camera unit 203) such as 1202 of FIG. 12, in the processing of the above-described S508 (FIG. 12). Incidentally, the application image frame 1200 is a virtual image frame based on the application information for the log-in user, which has been derived from the application displaying marker of the log-in user, which is displayed on the display unit 201 of the image forming apparatus 100, and on an operation image frame (UI) through which the log-in user operates the application from the mobile terminal 200. Incidentally, the camera image frame 1202 is displayed so that the user can check that the application displaying marker is always imaged by the camera unit 203.

FIG. 12 is a view illustrating one example of an application image frame 1200 which is displayed on the display unit 201 in S510 in FIG. 5.

The control unit 208 displays the application image frame 1200 together with the camera image frame 1202 with a similar technology to an augmented reality (AR), while the image (camera image) read out by the camera unit 203 is recognized to be the application displaying marker. Specifically, the mobile terminal 200 provides, to the log-in user the augmented reality to which the application information in the log-in user is added so as to be visually identifiable by the log-in user, on the camera image. Incidentally, the application information may be displayed so as to be overlapped with the camera image. In addition, this augmented reality is configured so as not to be provided to a person other than the log-in user, and the application information inherent to the log-in user is configured to be protected.

In addition, information necessary for being displayed here is all derived from the marker, is controlled by the control unit 208, and is displayed on the display unit 201. In Exemplary Embodiment 1, information on the tallying application is contained in the application displaying marker of the log-in user. Because of this, as illustrated in 1200 of FIG. 12, the record of printing and the like of the user are displayed on the application image frame 1200, together with the tallying period. In addition, when the button 1201 (UI) in the application image frame 1200 is selected (touched), the usage result during the previous tallying period is displayed by the control of the control unit 208. For information, the control unit 208 may be configured to derive the usage result during the previous tallying period from the image forming apparatus 100 through a LAN 300 when the button 1201 is touched, or the application displaying marker may be configured to previously contain the usage result.

The control unit 208 controls the I/F to a network so as to be capable of communication of the mobile terminal 200 with the image forming apparatus 100 through the LAN 300, while the camera image is recognized to be the application displaying marker of the log-in user. Accordingly, the control unit 208 may be configured to derive the above-described application information for the log-in user from the image forming apparatus 100 through the LAN 300.

Hereafter, the description will be returned to that for the flow chart of FIG. 5.

In S511, the control unit 208 determines whether the application displaying marker of the log-in user is recognized through the camera unit 203 (whether the camera image is recognized to be application displaying marker) or not. In the present exemplary embodiment, when a certain range of a marker 1204 is photographed within a dotted line frame 1203 in 1202 of FIG. 12, the control unit 208 determines that the application displaying marker is recognized. Incidentally, the control unit 208 may also be configured to determine that the application displaying marker is not recognized when the application displaying marker is not recognized for a predetermined period of time (for instance, 3 seconds) or longer, and determine that the application displaying marker is recognized even when the marker is not recognized if the period is within a predetermined period of time.

If the control unit 208 determines that the application displaying marker is recognized (in the case of Yes, in S511), the control unit 208 returns the processing to S510, and controls the display unit 201 so as to continue the display of the application information.

On the other hand, if the control unit 208 determines that the application displaying marker is not recognized (in the case of No, in S511), the control unit 208 advances the processing to S512, has the display unit 201 display an error or warning message (1300 of FIG. 13) on the display unit, and returns the processing to S501. At this time, the control unit 208 may notify the image forming apparatus 100 of the effect of logging out through the LAN 300.

Incidentally, in FIG. 5, during the processing in a dotted line frame illustrated by 513, the control unit 208 is in a state of being ready to receive a notification to be sent when the control unit 208 does not recognize the application displaying marker through the camera unit 203, and a notification to be sent when the user has directed the application to be ended, anytime. If the control unit 208 receives such a notification that the control unit 208 does not recognize the application displaying marker, the control unit 208 advances the processing to S512, has the display unit 201 display an error or warning message on the display unit, and returns the processing to S501. In addition, when the user directs the application to be ended, the control unit 208 hides the error or warning message, and ends the application. Incidentally, the case where the application has been directed to be ended by the user means the case where the application has been directed to be ended by an I/F 204 to the external of the mobile terminal 200, specifically, by the operation through a button such as the buttons 900, 901 and 902 in FIG. 9.

Incidentally, as has been described, the control unit 208 controls the I/F to a network so as to be capable of communicating with the image forming apparatus 100 through the LAN 300, while the camera image is recognized to be the application displaying marker. On the other hand, the control unit 208 controls the I/F to a network so as to cut off communication with the image forming apparatus 100 through the LAN 300, when the camera image becomes incapable of being recognized to be the application displaying marker. Specifically, while the user reads out the application displaying marker which is displayed on the display unit 105 of the image forming apparatus 100, with the marker read out application, the control unit 208 presents the information on the image forming apparatus 100 to the user, and performs control so that the user can operate the image forming apparatus 100 from the mobile terminal 200. On the other hand, when the user has stopped reading out the application displaying marker, which is displayed on the display unit 105 of the image forming apparatus 100, the control unit 208 stops presenting the information of the image forming apparatus 100 to the user, and performs control so that the user cannot operate the image forming apparatus 100 from the mobile terminal 200.

The processing of S506 in FIG. 5 will be described below with reference to FIG. 6.

FIG. 6 is a flow chart illustrating details of processing of S506 in FIG. 5.

Firstly, in S600, the control unit 208 determines whether the read out marker is an authentication marker or not. The control unit 208 performs this determination by checking the marker name from the information of the image forming apparatus, which the control unit 208 has derived from the marker (information which the control unit 208 has derived in the above-described S505). Incidentally, a format of the information contained in the authentication marker and an example are illustrated in FIG. 14.

In the above-described S600, if the control unit 208 is not been capable of determining that the read out marker is the authentication marker (in the case of No, in S600), the control unit 208 advances the processing to S603.

In S603, the control unit 208 notifies failure in authentication marker read out processing (for instance, by setting the information which indicates failure in authentication marker read out processing, to a return value), returns the processing to FIG. 5, and ends the processing of S506.

On the other hand, in the above-described S600, if the control unit 208 determines that the read out marker is the authentication marker (in the case of Yes, in S600), the control unit 208 advances the processing to S601.

In S601, the control unit 208 transmits user information which is registered in the mobile terminal (user registered in the mobile terminal), to the image forming apparatus 100 through the I/F 206 to a network, as the user information (authentication information) which is used for authenticating the log-in to a device, by using a wireless LAN address that the control unit 208 has derived from the authentication marker (first transmission processing). For information, the user information which is used for authenticating the log-in to a device is, for instance, the information as illustrated in 1600 of FIG. 16, and contains a log-in user name (ID) and a password. In addition, the user information (user registered in the mobile terminal) is the information which has been previously registered, and is memorized in the storage device in the control unit 208 in a state of being associated with a log-in application name and a log-in application version. The control unit 208 derives this user information by using the log-in application name and the log-in application version which the control unit 208 has derived from the authentication marker.

FIG. 16 is a view illustrating one example of the user information which is used for authenticating the log-in to a device. For information, this data format for the information is not limited in particular, and any data format may be used.

Hereafter, the description will be returned to that for the flow chart of FIG. 6.

In S602, the control unit 208 notifies success in authentication marker read out processing (for instance, by setting the information which indicates success in authentication marker read out processing, to a return value), returns the processing to FIG. 5, and ends the processing of the S506.

The processing of S508 in FIG. 5 will be described below with reference to FIG. 7.

FIG. 7 is a flow chart illustrating details of processing of S508 in FIG. 5.

Firstly, in S700, the control unit 208 has the camera unit 203 take an image of the application displaying marker which is displayed on the display unit 105 of the image forming apparatus 100 and read out the application displaying marker, and simultaneously has the display unit 201 display the read out image on the display unit.

Next, in S701, the control unit 208 determines whether the camera unit has succeeded in reading out the application displaying marker or not.

If the control unit 208 cannot recognize the marker within the dotted line frame, the control unit 208 determines that the camera unit has failed in reading out the application displaying marker (in the case of No, in S701), returns the processing to S700, and controls the camera unit so as to read out the application displaying marker again.

On the other hand, if the control unit 208 is capable of recognizing the marker within the dotted line frame, the control unit 208 determines that the camera unit has succeeded in reading out the application displaying marker (in the case of Yes, in S701), and advances the processing to S702.

In S702, the control unit 208 analyzes the information which is input through the camera unit 203 and is contained in the application displaying marker, and derives the analyzed information.

Next, in S703, the control unit 208 determines whether the read out marker is the application displaying marker of the log-in user or not. The control unit 208 performs this determination by checking the marker name from the information of the image forming apparatus, which the control unit 208 has derived from the marker (information which the control unit 208 has derived in the above-described S702). Incidentally, a format of the information contained in the application displaying marker and an example are illustrated in FIG. 15.

In the above-described S703, if the control unit 208 is not capable of determining that the read out marker is the application displaying marker of the log-in user (in the case of No, in S703), the control unit 208 advances the processing to S708.

In S708, the control unit 208 notifies failure in the read out processing of the application displaying marker (for instance, by setting the information which indicates failure in read out processing of application displaying marker, to a return value), returns the processing to FIG. 5, and ends the processing of S508.

On the other hand, in the above-described S703, if the control unit 208 determines that the read out marker is the application displaying marker (in the case of Yes, in S703), the control unit 208 advances the processing to S704.

In S704, the control unit 208 determines whether the authentication of the log-in to a device has succeeded or not. For information, a result of the authentication of the log-in to a device is also contained in the information contained in the marker.

In the above-described S704, if the control unit 208 determines that the authentication of the log-in to a device has failed (in the case of No, in S704), the control unit 208 advances the processing to S708, notifies failure in the read out processing of application displaying marker, returns the processing to FIG. 5, and ends the processing of S508.

On the other hand, in the above-described S704, if the control unit 208 determines that the authentication of the log-in to a device has succeeded (in the case of Yes, in S704), the control unit 208 advances the proceeding to S705.

In S705, the control unit 208 determines whether the name of the user successful in the log-in (that is contained in application displaying marker) is the same as (coincides with) the name of the user, which has been transmitted to the image forming apparatus 100 (user registered in the mobile terminal) in the above-described S601 or not.

In the above-described S705, if the control unit 208 determines that the above-described name of the user successful in the log-in is not the same as the above-described user registered in the mobile terminal (in the case of No, in S705), the control unit 208 advances the processing to S708, notifies failure in the read out processing of the application displaying marker, returns the processing to FIG. 5, and ends the processing of S508.

On the other hand, in the above-described S705, if the control unit 208 determines that the above-described name of the user successful in the log-in is the same as (coincides with) the user registered in the mobile terminal (in the case of Yes, in S705), the control unit 208 advances the processing to S706.

In S706, the control unit 208 derives the displaying application information from the application displaying marker, and produces an image frame (image frame such as 1200 of FIG. 12) which is displayed on the display unit 201, based on the derived information.

Next, in S707, the control unit 208 notifies success in the read out processing of application displaying marker (for instance, by setting information which indicates success in the read out processing of application displaying marker, to a return value), returns the processing to FIG. 5, and ends the processing of S508.

The above-described processing enables communication between the mobile terminal and the image forming apparatus, only while the user recognizes the marker (recognition code (image pattern)) which is displayed on the display unit of the image forming apparatus, on a camera image of the mobile terminal, and accordingly, it is secured that the user who is using the image forming apparatus through the mobile terminal surely exists in an immediate area of the image forming apparatus. Accordingly, it becomes clear for other users to know who uses the image forming apparatus.

In addition, the displayed marker changes to a marker (first image pattern) for a user who has logged in after the log-in to the device has been authenticated, and accordingly, even when another user photographs the displayed marker by a camera, the user information cannot be viewed by the other user (application image frame 1200 will not be displayed to the other user).

The above-described processing reduces the possibility of the simultaneous operation by a plurality of users, and can keep the security of the user.

In addition, as for a personal identification method as well, the image forming apparatus performs the authentication processing between the user and the image forming apparatus, based on the user information which has been previously registered in the mobile terminal. Accordingly, the user does not need to input the password and the like every time the user performs authentication. In addition, the user transmits the user information from the mobile terminal to the image forming apparatus by reading out an authentication marker (second image pattern) which is displayed on the display unit of the image forming apparatus with the mobile terminal, while using the address embedded in the authentication marker. Accordingly, the user does not need an effort of setting the address of the image forming apparatus. Thus, the above-described processing can reduce the operational load of the user concerning the authentication, and can eliminate connection from an inappropriate terminal.

In addition, the above-described processing provides an effect of enabling a color display and a display having a complicated layout, even when the image forming apparatus is provided with a display unit having a small sized image frame and/or a display unit of a monochrome display, by displaying a virtual image frame on the display unit of the mobile terminal, based on the information on the application which is installed in the image forming apparatus and an operation image frame (UI) through which the user can use the application.

Exemplary Embodiment 2

In the above-described Exemplary Embodiment 1, an example has been described in which the mobile terminal 200 reads out a device log-in authentication marker and logs in, and then the marker on the display unit 105 in the image forming apparatus 100 is changed to the application displaying marker.

However, information on the application, which a user desires to display on a display unit 201 of the mobile terminal 200, is not limited to the information on one application. Accordingly, in Exemplary Embodiment 2, an application displaying list can be displayed so that the applications to be displayed on the mobile terminal 200 can be selected.

In Exemplary Embodiment 2, the processing will be described which enables a tallying application and a secure print application that are provided in the image forming apparatus 100 to be displayed in the application displaying list, and enables the application to be selected.

The secure print application has a function of providing at-a-glance information on print jobs which have been executed by the user, to the user, and executing printing by the image forming apparatus 100 after the user has selected a print job.

The configurations of the image forming apparatus 100 and the mobile terminal 200 and the system configuration in Exemplary Embodiment 2 are similar to those in FIGS. 1, 2 and 3 of Exemplary Embodiment 1, and accordingly, the description will be omitted.

Firstly, the processing which is executed by the image forming apparatus 100 in Exemplary Embodiment 2 will be described with reference to FIG. 17.

Figure 17:
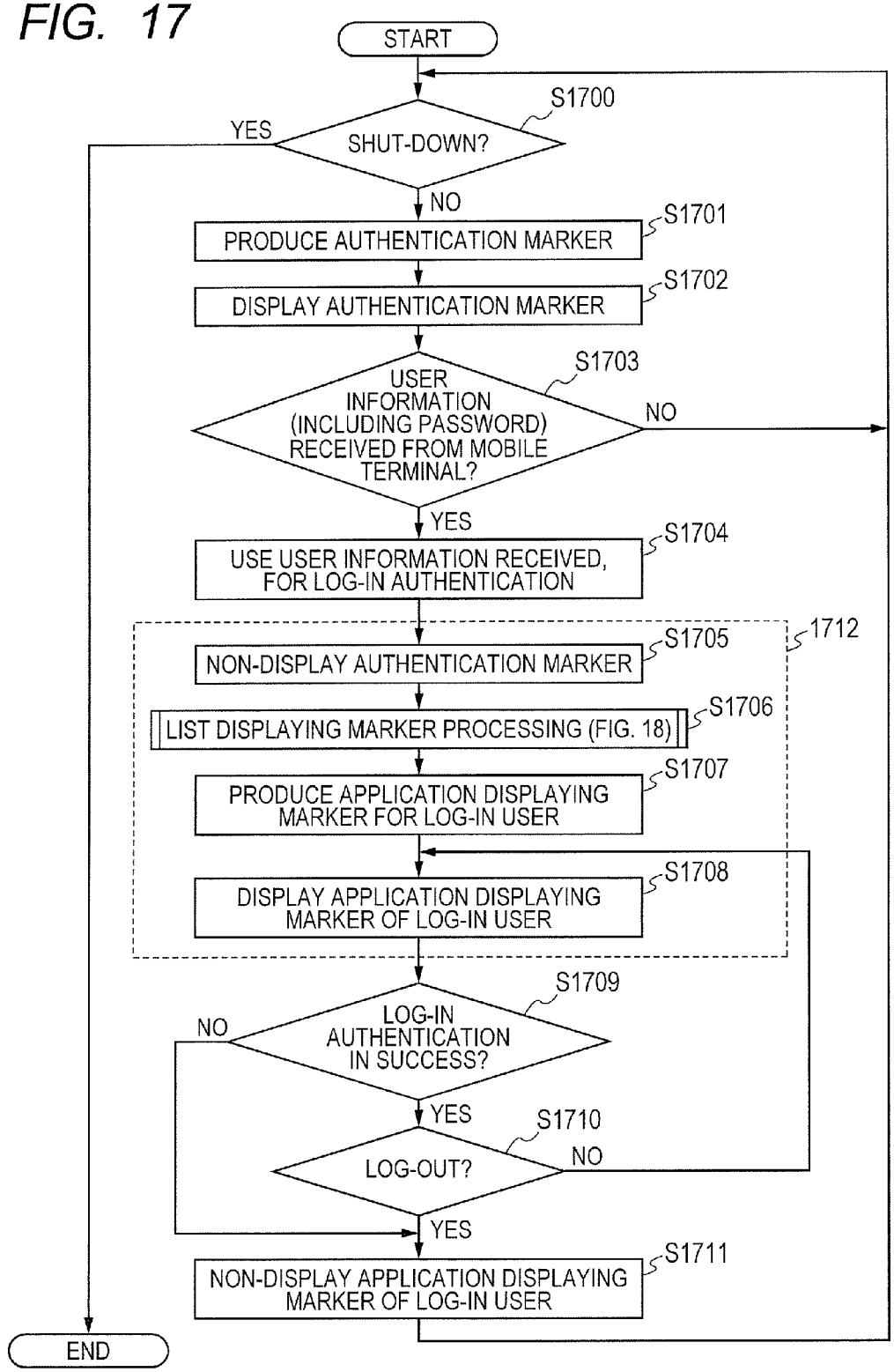
FIG. 17 is a flow chart illustrating one example of processing which is executed by the control unit 112 of the image forming apparatus 100, in Exemplary Embodiment 2.

FIG. 17 is a flow chart illustrating one example of the processing which is executed by the control unit 112 in the image forming apparatus 100, in Exemplary Embodiment 2. Incidentally, the processing in the flow chart illustrated in FIG. 17 and FIG. 18 is achieved by such operation that a CPU (not shown) in the control unit 112 reads out a program which has been computer-readably recorded in a storage device (not shown) in the control unit 112, and executes the read out program.

In addition, the processing illustrated in FIG. 17 includes a list displaying processing (S1706) of the application that the log-in user can use by using the list displaying marker, which has been added between S405 and S406 in FIG. 4. Accordingly, processes of S1700 to S1705 and S1707 to S1711 are similar to processes of S401 to S405 and S406 to S410 in FIG. 4, and accordingly, the description will be omitted.

In S1706, the control unit 112 performs the list displaying marker processing of the application which the log-in user can use. Incidentally, details of this processing are illustrated in FIG. 18.

Figure 18:
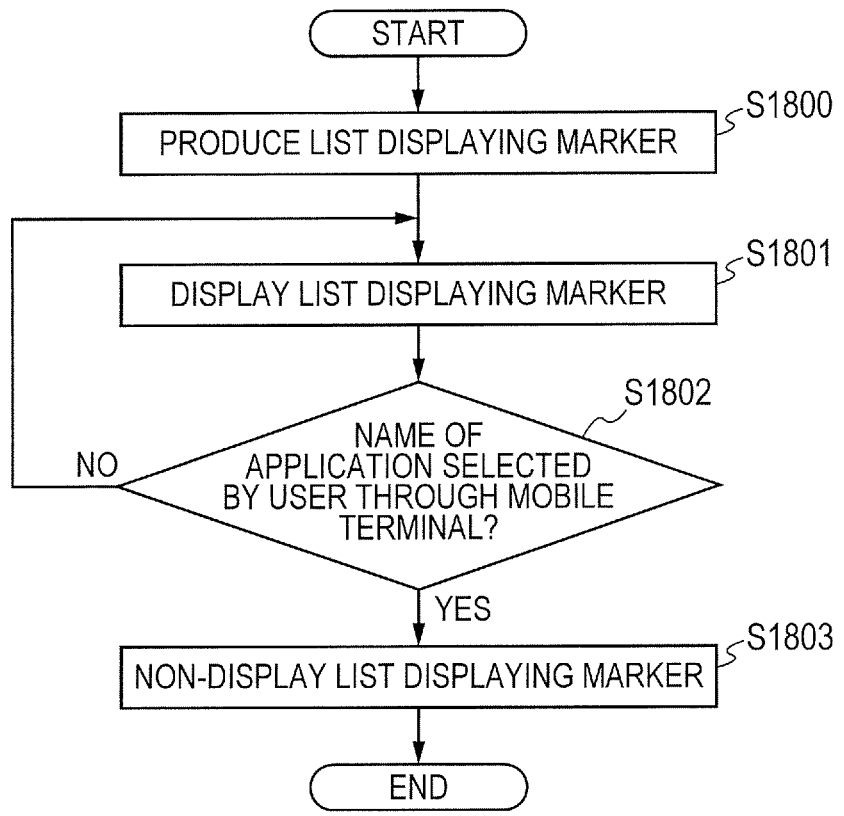
FIG. 18 is a flow chart illustrating details of processing of S1706 in FIG. 17.

FIG. 18 is a flow chart illustrating details of processing of S1706 in FIG. 17.

Firstly, in S1800, the control unit 112 produces the list displaying marker (third image pattern) of the application which the log-in user can use. Incidentally, the information as illustrated in 2300 of FIG. 23 is contained in this list displaying marker of the application.

FIG. 23 is a view illustrating one example of a data format which is contained in a list displaying marker of the application that the log-in user can use.

The example illustrated in FIG. 23 illustrates that the tallying application and the secure print application are contained in the list of the applications which the log-in user of the list displaying marker can use. For information, the data format for the list displaying marker is not limited, and any data format may be used. For instance, a format of XML, JSON, CSV or the like may be used.

Next, in S1801, the control unit 112 has the display unit 105 display the list displaying marker of the application that the log-in user can use, which has been produced in the above-described S1800, on the display unit (display control).

Next, in S1802, the control unit 112 determines whether the I/F 101 to a network has received a displaying application name (application information illustrated in FIG. 24, which will be described later) which is transmitted from the mobile terminal 200 through the network 300 and has been selected by the user or not. In other words, the control unit 112 determines whether the I/F 101 to a network has received the selection result (displaying application name) which the user has selected on the mobile terminal 200 by using the list that has been embedded in the list displaying marker which has been generated and displayed in the above-described S1800 and S1801 (third generation processing), and has transmitted to the I/F 101 to a network or not.

If the control unit 112 determines that the I/F101 to a network has not received the displaying application name which has been selected by the user, from the mobile terminal 200 (in the case of No, in S1802), the control unit 112 returns the processing to S1801, and controls the display unit 105 so as to continue displaying the list displaying marker.

On the other hand, if the control unit 112 determines that the I/F101 to a network has received the displaying application name which has been selected by the user, from the mobile terminal 200 (in the case of Yes, in S1802), the control unit 112 advances the processing to S1803.

In S1803, the control unit 112 hides the list displaying marker of the application which the log-in user can use and which is displayed on the display unit 105, returns the processing to FIG. 17, and ends the processing of S1706.

Next, processing which is executed by the mobile terminal 200 in Exemplary Embodiment 2 will be described below with reference to FIG. 19.

Figure 19:
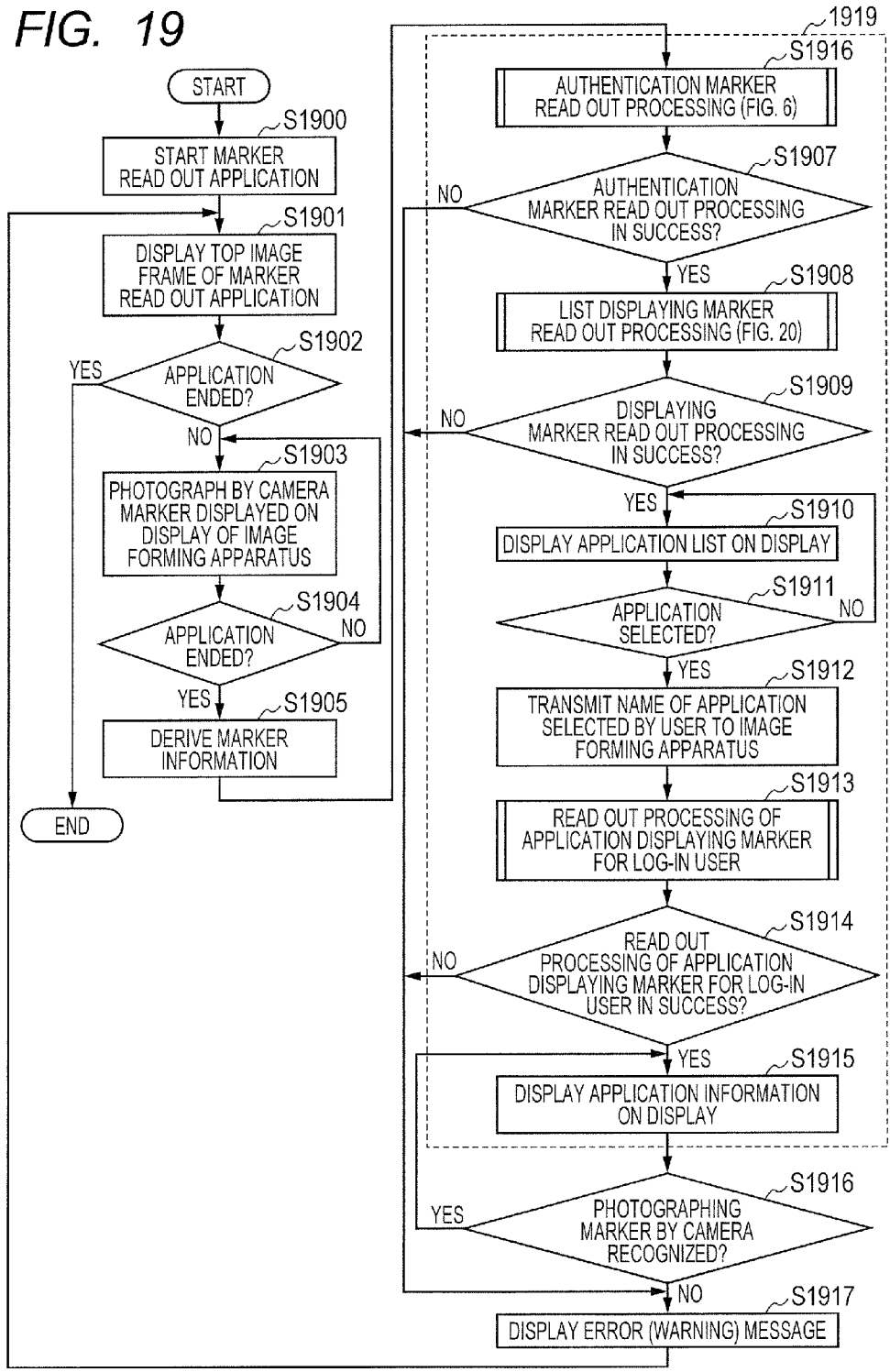
FIG. 19 is a flow chart illustrating one example of processing which is executed by the mobile terminal 200, in Exemplary Embodiment 2.
Figure 20:
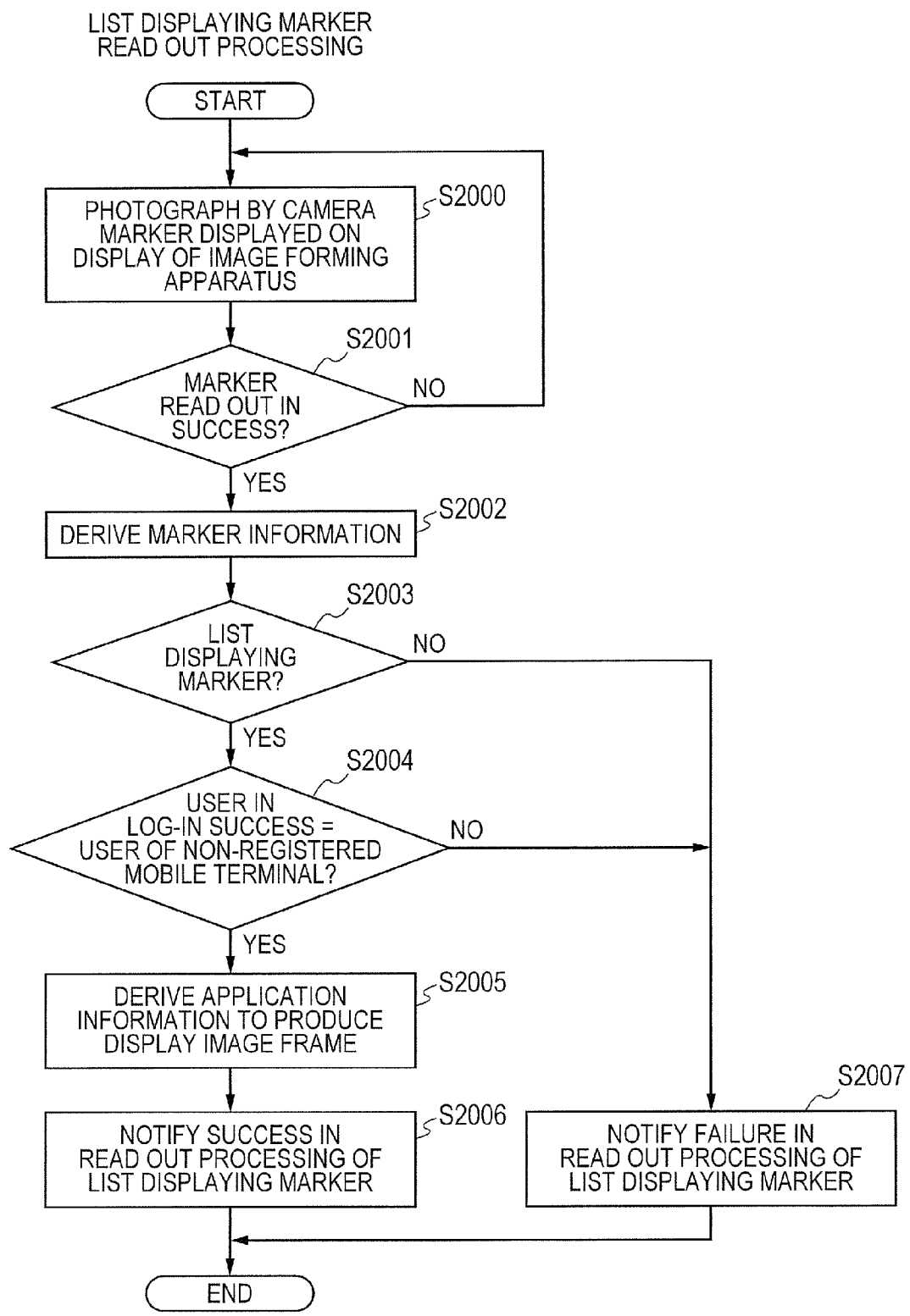
FIG. 20 is a flow chart illustrating details of processing of S1908 in FIG. 19.

FIG. 19 is a flow chart illustrating one example of processing which is executed by the mobile terminal 200, in Exemplary Embodiment 2. Incidentally, the processing in the flow charts illustrated in FIG. 19 and FIG. 20 is achieved by such operation that a CPU (not shown) in the control unit 208 executes a program which has been computer-readably recorded in a storage device (not-shown) in the control unit 208.

Incidentally, the processing in FIG. 19 includes a list displaying marker read out processing (S1908) of the application that the log-in user can use, which has been added between S507 and S508 in FIG. 5. Accordingly, the processes of S1900 to S1907 are similar to those of S500 to S507 in FIG. 5, and accordingly, the description will be omitted. The processing of S1908 and subsequent processing will be described below.

In S1908, the control unit 208 performs the list displaying marker read out processing of the application which the log-in user can use. The details of this processing are illustrated in FIG. 20, which will be described later.

Next, in S1909, the control unit 208 determines whether the processing of the above-described S1908 has succeeded or not.

If the control unit 208 determines that the processing of the above-described S1908 has failed (in the case of No, in S1909), the control unit 208 advances the processing to S1917, has the display unit 201 display an error or a warning message (1300 of FIG. 13) on the display unit, and returns the processing to S1901.

On the other hand, if the control unit 208 determines that the processing of the above-described S1908 has succeeded (in the case of Yes, in S1909), the control unit 208 advances the processing to S1910.

Figure 21:
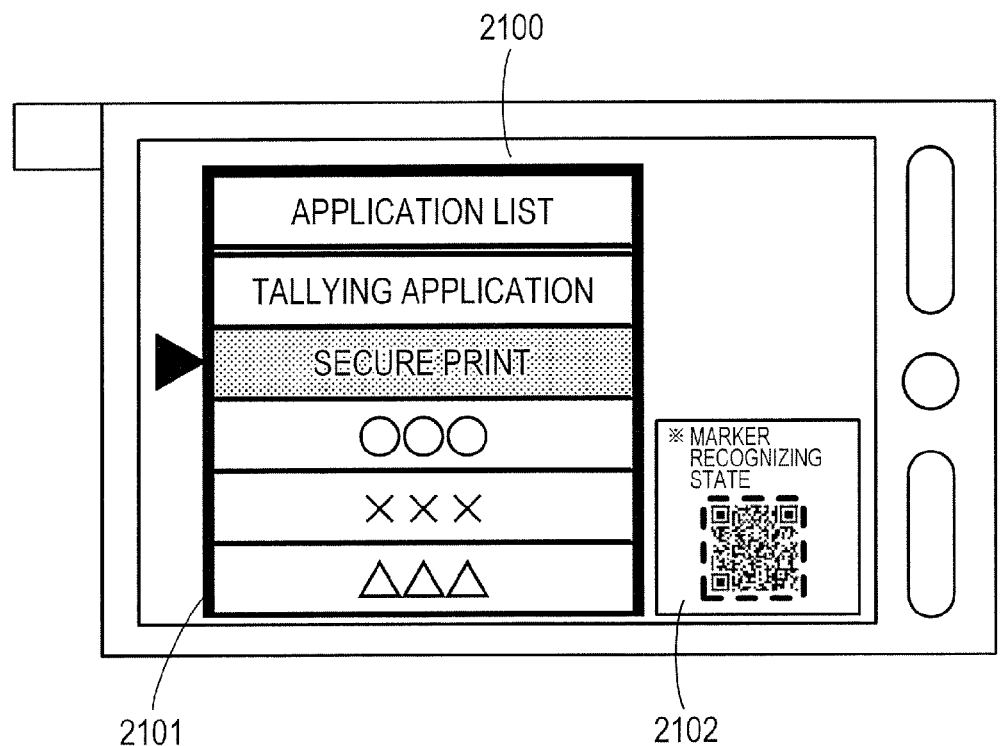
FIG. 21 is a view illustrating one example of an application image frame 1200 which is displayed on the display unit 201 in S1910 in FIG. 19.

In S1910, the control unit 208 has the display unit 201 display the list information of the application which has been derived from the marker and which the log-in user can use, and an operation image frame (UI) through which the log-in user selects the application from the list and operates the application, on the display unit, together with the image frame that the camera unit 203 has read out (camera image), as augmented reality (2100 of FIG. 21).

FIG. 21 is a view illustrating an example of the application image frame 2100 which is displayed on the display unit 201 in S1910 of FIG. 19.

In FIG. 21, 2101 is the display that corresponds to the list information of the application which has been derived from the list displaying marker and which the log-in user can use, and the operation image frame (UI) through which the log-in user selects the application from the list and operates the application. In addition, 2102 is the display that corresponds to the image of the list displaying marker which is read out by the camera unit 203.

The example illustrated in FIG. 21 illustrates that the tallying application and the secure print application are contained as applications which the log-in user can use.

Hereafter, the description will be returned to that for the flow chart of FIG. 19.

In S1911, the control unit 208 determines whether the application name selected by the user has been notified thereto through the display unit 201 or the operating unit 202 or not.

If the control unit 208 determines that the application name selected by the user has not been notified in the above-described S1911 (No in S1911), the control unit 208 returns the processing to S1910, and controls the display unit 201 so as to continue displaying the list information of the application.

On the other hand, if the control unit 208 determines that the application name selected by the user has been notified in the above-described S1911 (Yes in S1911), the control unit 208 advances the processing to S1912.

In S1912, the control unit 208 transmits the application name which has been selected by the above-described user (selection result), to the image forming apparatus 100 through the I/F 206 to a network, as the displaying application information as illustrated in 2400 of FIG. 24, by using a wireless LAN address (IP address when the TCP/UDP/IP protocol is used) (second transmission processing).

FIG. 24 is a view illustrating one example of a data format of application information which is transmitted to the image forming apparatus from the mobile terminal, in Exemplary Embodiment 2.

The example illustrated in FIG. 24 illustrates that the secure print application has been selected.

When the processing of the above-described S1912 is completed, the control unit 208 advances the processing to S1913.

In S1913, the control unit 208 performs the read out processing for the marker which contains the application information corresponding to the application information that has been transmitted in the above-described S1912. In other words, when the secure print application has been transmitted to the image forming apparatus 100 in the above-described S1912, the read out processing for the marker is performed which contains the secure print application information. The processing of S1913 is similar to that in FIG. 7, and accordingly the description will be omitted.

Next, in S1914, the control unit 208 determines whether the processing of the above-described S1913 has succeeded or not.

If the control unit 208 determines that the processing of the above-described S1914 has failed (in the case of No, in S1914), the control unit 208 advances the processing to S1917, has the display unit 201 display an error or warning message (1300 of FIG. 13) on the display unit, and returns the processing to S1901.

On the other hand, if the control unit 208 determines that the processing of the above-described S1913 has succeeded (in the case of Yes, in S1914), the control unit 208 advances the processing to S1915.

Figure 22:
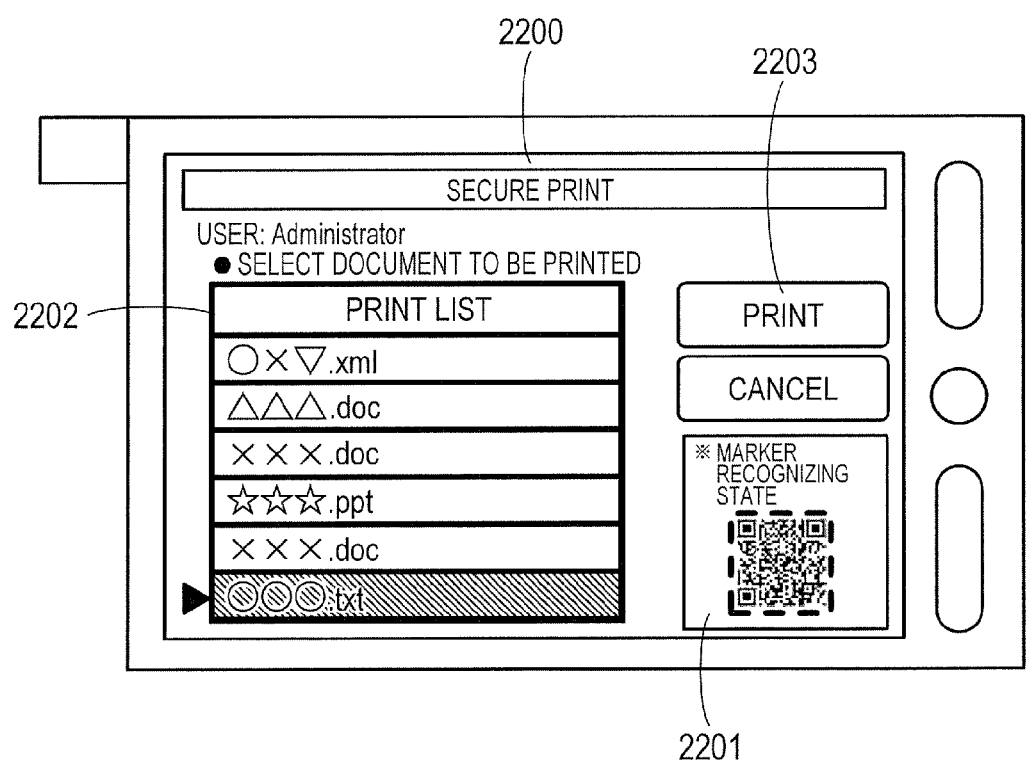
FIG. 22 is a view illustrating one example of a secure print application image frame.

In S1915, the control unit 208 has the display unit 201 display a virtual image frame (for instance, 2200 of FIG. 22) that is based on the application information and an operation image frame (UI) through which the log-in user operates the application from the mobile terminal, on the display unit, together with a camera image frame (2201 of FIG. 22). Incidentally, the application information is the application information for the log-in user, which has been derived from the application displaying marker for the log-in user, which is displayed on the display unit 201 in the image forming apparatus 100 in the processing of the above-described S1913.

For instance, when the secure print application has been transmitted to the image forming apparatus 100 as a selection result in the above-described S1912, the virtual image frame (secure print application image frame 2200) that is based on the secure print application information and the operation image frame through which the user uses the secure print application is displayed together with the camera image 2201 (or may be displayed so as to be overlapped with each other).

FIG. 22 is a view illustrating one example of the secure print application image frame.

As is illustrated in FIG. 22, the control unit 208 displays the virtual image frame (secure print application image frame) 2200 that is based on the secure print application information (job list 2202) and the operation image frame 2203 through which the user uses the secure print application, together with the camera image 2201.

In this image frame 2200, when a user selects a print job from 2202 and directs a print execution from 2203, the control unit 208 of the mobile terminal 200 transmits the print direction of the above-described selected print job to the image forming apparatus 100. In response to the direction, the secure print application of the image forming apparatus 100 starts printing of the above-described selected print job.

Incidentally, the processes of S1916 to S1917 are similar to those of S511 to S512 in FIG. 5, and accordingly the description will be omitted.

Next, the processing of S1908 in FIG. 19 will be described with reference to FIG. 20.

FIG. 20 is a flow chart illustrating details of the processing of S1908 in FIG. 19.

Firstly, in S2000, the control unit 208 has a camera unit 203 take an image of the list displaying marker of the application that the log-in user can use, which is displayed on the display unit 105 of the image forming apparatus 100 (hereafter referred to as list displaying marker), and read out the list displaying marker, and simultaneously has the display unit 201 display the read out image on the display unit.

Next, in S2001, the control unit 208 determines whether the camera unit has succeeded in reading out the list displaying marker or not.

When the control unit 208 cannot recognize the marker within the dotted line frame, the control unit 208 determines that the camera unit has failed in reading out the list displaying marker (No in S2001), returns the processing to S2000, and controls the camera unit so as to read out the list displaying marker again.

On the other hand, if the control unit 208 is capable of recognizing the marker within the dotted line frame, the control unit 208 determines that the camera unit has succeeded in reading out the list displaying marker (Yes in S2001), and advances the processing to S2002.

In S2002, the control unit 208 analyzes the information which is input through the camera unit 203 and is contained in the list displaying marker, and derives the result.

Next, in S2003, the control unit 208 determines whether the read out marker is the list displaying marker or not. The control unit 208 performs this determination by checking the marker name from the information of the image forming apparatus which the control unit 208 has derived from the marker (information which the control unit 208 has derived in the above-described S2002). A format of the information contained in the list displaying marker and an example are illustrated in FIG. 23.

In the above-described S2003, if the control unit 208 is not capable of determining that the read out marker is the list displaying marker (in the case of No, in S2003), the control unit 208 advances the processing to S2007.

In S2007, the control unit 208 notifies failure in the read out processing of the list displaying marker (for instance, by setting the information which indicates failure in list displaying marker read out processing, to a return value), and ends the processing of S1908 in FIG. 19.

On the other hand, in the above-described S2003, if the control unit 208 determines that the read out marker is the list displaying marker (in the case of Yes, in S2003), the control unit 208 advances the processing to S2004.

In S2004, if the control unit 208 determines whether the name of the user successful in the log-in (that is contained in the list displaying marker) is the same as the name of the user (user registered in the mobile terminal), which has been transmitted to the image forming apparatus 100 in the above-described S601 or not.

In the above-described S2004, if the control unit 208 determines that the above-described name of the user successful in the log-in is not the same as the above-described user registered in the mobile terminal (in the case of No, in S2004), the control unit 208 advances the processing to S2007, notifies failure in the read out processing of the list displaying marker, and ends the processing of S1908.

On the other hand, in the above-described S2004, if the control unit 208 determines that the above-described name of the user successful in the log-in is the same as the above-described user registered in the mobile terminal (in the case of Yes, in S2004), the control unit 208 advances the processing to S2005.

In S2005, the control unit 208 derives the displaying application information from the list displaying marker, and produces an image frame (image frame such as 2100 of FIG. 21) which is displayed on the display unit 201, based on the derived information.

In S2006, the control unit 208 notifies success in list displaying marker read out processing, and ends the processing of S1908.

In the image frame 2100 illustrated in FIG. 21, when the user selects the application of "secure print," the image forming apparatus 100 displays a marker which contains at-a-glance information on print jobs of the user. When the mobile terminal 200 has recognized the marker, the at-a-glance print jobs illustrated in FIG. 22 are displayed on the display unit 201 of the mobile terminal 200.

The above-described processing can provide an effect that the log-in user can select the application which the user desires to display on the display unit 201 of the mobile terminal 200 from the display unit 201 of the mobile terminal 200. In addition, due to this effect, the information processing system can enhance the compatibility with the application which requires higher security such as "reservation printing" that enables only the printing jobs of the user to be printed, by making the user go to the proximity of the image forming apparatus 100. Specifically, the information processing system is enabled to enhance the compatibility with the applications such as a pull-print and the secure print.

Incidentally, in each of the above-described exemplary embodiments, the present invention has been described while taking the tallying application and the secure print application as examples of the applications which are installed in the image forming apparatus 100. However, the application to which the present invention can be applied is not limited to these applications, but may be any type of application as long as the application can be executed in the image forming apparatus 100.

As has been shown above, each exemplary embodiment of the present invention enables the communication, only while the user recognizes the marker (recognition code) which is displayed on the display unit of the image forming apparatus, on the mobile terminal, and accordingly, ensures that the user is always in the immediate area of the image forming apparatus. Accordingly, it becomes clear for other users to know who uses the image forming apparatus.

Furthermore, because the displayed marker changes to a marker for the log-in user after the log-in to a device has been authenticated, users except the log-in user cannot read out the marker even if having tried to read out the marker, and such event does not occur that the information of the log-in user is seen. Thus, the information processing system controls the operation image frame of the mobile terminal so as to fit a situation of the operation image frame of the image forming apparatus at the time when the communication is enabled, and can further enhance the operability of the image forming apparatus.

Accordingly, the information processing system reduces such a possibility that an image forming apparatus is used simultaneously by a plurality of users, and can keep the security of the user, even when the user uses the image forming apparatus through the mobile terminal, by having the user use the image forming apparatus in the immediate area of the image forming apparatus, and by making it clear for other users to know who uses the image forming apparatus.

In addition, as for a personal identification method as well, the image forming apparatus performs the authentication processing between the user and the image forming apparatus, based on the user information which the mobile terminal has, and accordingly, the information processing system shows effects of reducing the operation load of the user, being capable of eliminating connection from an inappropriate terminal and the like.

Incidentally, it should be readily apparent that the configuration and the contents of the above-described various data are not limited to these configuration and contents, but include various configurations and contents according to the use and the purpose.

In the above, one embodiment has been shown, but the present invention can employ an embodiment in a form of a system, an apparatus, a method, a program or a storage medium, for instance. Specifically, the present invention may be applied to a system which includes multiple equipment, or also may be applied to an apparatus which includes a single equipment.

In addition, all configurations which have combined each of the above-described various exemplary embodiments with one another are also included in the present invention.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132721, filed on Jun. 12, 2012, which is hereby incorporated by reference herein in its entirety.

What is claimed is:

1. An information processing system comprising:
an image forming apparatus; and
a mobile terminal,
wherein the image forming apparatus includes:
an authentication unit configured to authenticate a user;
a first generating unit configured to generate a first image pattern in which user information authenticated by the authentication unit and application information relating to a predetermined application which is permitted to be used in the image forming apparatus by the authenticated user are embedded;
a second generating unit configured to generate a second image pattern in which address information for communication with the image forming apparatus is embedded; and
a display control unit configured to display, on a display of the image forming apparatus, the generated first and second image patterns, and
wherein the mobile terminal includes:
a read out unit configured to read out an image pattern displayed on the display of the image forming apparatus;
a deriving unit configured to analyze the first image pattern read out by the read out unit, to derive the user information and the application information; and
a control unit configured to display, on a display of the mobile terminal, an operation image for using the predetermined application to which the application information derived by the deriving unit relates during a period of reading out of the first image pattern by the read out unit,
wherein the operation image is displayed on the display of the mobile terminal as a virtual operation screen usable by the authenticated user to operate the predetermined application which is provided in the image forming apparatus.

2. The information processing system according to claim 1, wherein
the authentication unit performs authentication processing based on authentication information transmitted from the mobile terminal using the address information embedded in the second image pattern, and
the display control unit displays, on the display of the image forming apparatus, the first pattern generated by the first generating unit when the authentication process is successfully performed.

3. The information processing system according to claim 2, wherein the mobile terminal further includes a first transmitting unit configured to transmit the authentication information to the image forming apparatus, using the address information derived by the deriving unit according to the reading out of the second image pattern by the read out unit.

4. The information processing system according to claim 2, wherein
the image forming apparatus further includes a third generating unit configured to generate a third image pattern in which list information representing a list of at least one application which is permitted to be used in the image forming apparatus by the authenticated user is embedded, when the authentication processing is successfully performed,
the display control unit displays the third image pattern generated on the display of the image forming apparatus,
the deriving unit analyzes the third image pattern read out by the read out unit, to derive the information of the list of the application information, and
the control unit displays, on the display of the mobile terminal, the image frame of the list corresponding to the list information, during a period of reading out of the third image pattern.

5. The information processing system according to claim 4, wherein the mobile terminal further includes:
a selecting unit configured to select an application desired to be used in the mobile terminal from the list; and
a second transmitting unit configured to transmit a result of the selecting by the selecting unit to the image forming apparatus.

6. The information processing system according to claim 5, wherein
the list includes the predetermined application, and
when the result of the selecting by the selecting unit transmitted by the second transmitting unit from the mobile terminal to the image forming apparatus indicates that the predetermined application is selected, the first generating unit generates the first image pattern.

7. The information processing system according to claim 4, wherein the list includes an application configured to perform secure printing.

* * * * *